US011215856B2

(12) United States Patent
Byoun et al.

(10) Patent No.: US 11,215,856 B2
(45) Date of Patent: Jan. 4, 2022

(54) ELECTRONIC APPARATUS FOR CONTROLLING PASSENGER SEAT DISPLAY AND METHOD OF CONTROLLING PASSENGER SEAT DISPLAY

(71) Applicant: Samsung Electronics Co., Ltd., Gyeonggi-do (KR)

(72) Inventors: Daehyoun Byoun, Gyeonggi-do (KR); Joonseok Ahn, Gyeonggi-do (KR); Kyehoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/008,814

(22) Filed: Sep. 1, 2020

(65) Prior Publication Data
US 2021/0063783 A1  Mar. 4, 2021

(30) Foreign Application Priority Data

Sep. 2, 2019 (KR) .................. 10-2019-0108463

(51) Int. Cl.
*G09G 5/10* (2006.01)
*G02F 1/13* (2006.01)
*B60K 35/00* (2006.01)
*G02F 1/13357* (2006.01)
(Continued)

(52) U.S. Cl.
CPC ............ *G02F 1/1323* (2013.01); *B60K 35/00* (2013.01); *B60R 1/00* (2013.01); *G02F 1/133611* (2013.01); *G09G 3/3607* (2013.01); *G09G 3/3696* (2013.01); *G09G 2320/068* (2013.01); *G09G 2320/0626* (2013.01)

(58) Field of Classification Search
CPC . G02F 1/1323; G02F 1/133611; B60K 35/00; G09G 3/3607; G09G 3/3696; G09G 2320/0626; G09G 2320/068; B60R 1/00
See application file for complete search history.

(56) References Cited

U.S. PATENT DOCUMENTS

| 10,008,164 | B2 | 6/2018 | Du et al. |
| 2005/0179827 | A1 | 8/2005 | Scharenbroch et al. |
| 2007/0030240 | A1 | 2/2007 | Sumiyoshi et al. |

(Continued)

FOREIGN PATENT DOCUMENTS

| CN | 1975332 B | 6/2010 |
| JP | 2007-045168 A | 2/2007 |

(Continued)

OTHER PUBLICATIONS

International Search Report dated Nov. 23, 2020.
European Search Report dated Feb. 8, 2021.

*Primary Examiner* — Abdul-Samad A Adediran
(74) *Attorney, Agent, or Firm* — Cha & Reiter, LLC

(57) ABSTRACT

An electronic apparatus for controlling a passenger seat display in front of a passenger sitting on a passenger seat and a method of controlling the passenger seat display are provided. An electronic apparatus and a control method for changing a viewing angle of a passenger seat display according to a operating state of a vehicle and adjusting brightness or color coordinates of the passenger seat display are provided. A structure of a backlight unit for increasing light-gathering power to improve brightness of a passenger seat display is provided.

20 Claims, 14 Drawing Sheets

(51) Int. Cl.
   *G09G 3/36*   (2006.01)
   *B60R 1/00*   (2006.01)

(56) References Cited

U.S. PATENT DOCUMENTS

| | | |
|---|---|---|
| 2007/0129864 A1 | 6/2007 | Tanaka et al. |
| 2007/0171193 A1 | 7/2007 | Nakamura |
| 2008/0129684 A1 | 6/2008 | Adams et al. |
| 2009/0185083 A1 | 7/2009 | Ohtoshi et al. |
| 2014/0145933 A1 | 5/2014 | Chae et al. |
| 2016/0193924 A1 | 7/2016 | Kim et al. |
| 2018/0018939 A1* | 1/2018 | Choi .......................... B60R 1/00 |
| 2018/0210243 A1 | 7/2018 | Fang et al. |

FOREIGN PATENT DOCUMENTS

| | | |
|---|---|---|
| JP | 2008-203446 A | 9/2008 |
| KR | 10-1416378 B1 | 7/2014 |

\* cited by examiner

< STOP MODE >

< DRIVING MODE >

| | X COLOR COORDINATE | | Y COLOR COORDINATE | |
|---|---|---|---|---|
| | COLOR COORDINATE MEASUREMENT VALUE | MEASUREMENT VALUE CHANGE AMOUNT | COLOR COORDINATE MEASUREMENT VALUE | MEASUREMENT VALUE CHANGE AMOUNT |
| NO VIEWING ANGLE SWITCHING ELEMENT | 0.3075 | - | 0.3333 | - |
| VIEWING ANGLE SWITCHING ELEMENT ON | 0.3166 | +0.0091 | 0.3428 | +0.0095 |
| VIEWING ANGLE SWITCHING ELEMENT OFF | 0.3225 | +0.0150 | 0.3515 | +0.0182 |

802 — COLOR COORDINATE MEASUREMENT VALUE
804 — MEASUREMENT VALUE CHANGE AMOUNT (X)
806 — COLOR COORDINATE MEASUREMENT VALUE (Y)
808 — MEASUREMENT VALUE CHANGE AMOUNT (Y)

810 — TARGET COLOR COORDINATES

| TARGET COLOR COORDINATES | |
|---|---|
| X COORDINATE | 0.3302 |
| Y COORDINATE | 0.3401 |

820 — VIEWING ANGLE SWITCHING ELEMENT ON (DRIVING MODE)

| COLOR COORDINATES | TARGET COLOR COORDINATES | CORRECTION VALUES | ADJUSTMENT VALUES |
|---|---|---|---|
| X COORDINATE | 0.3302 | -0.0091 | 0.3211 |
| Y COORDINATE | 0.3401 | -0.0095 | 0.3251 |

824 — CORRECTION VALUES
826 — ADJUSTMENT VALUES

830 — VIEWING ANGLE SWITCHING ELEMENT OFF (STOP MODE)

| COLOR COORDINATES | TARGET COLOR COORDINATES | CORRECTION VALUES | ADJUSTMENT VALUES |
|---|---|---|---|
| X COORDINATE | 0.3302 | -0.0059 | 0.3243 |
| Y COORDINATE | 0.3401 | -0.0087 | 0.3314 |

834 — CORRECTION VALUES
836 — ADJUSTMENT VALUES

ELECTRONIC APPARATUS FOR CONTROLLING PASSENGER SEAT DISPLAY AND METHOD OF CONTROLLING PASSENGER SEAT DISPLAY

CROSS-REFERENCE TO RELATED APPLICATION

This application is based on and claims priority under 35 U.S.C. § 119 to Korean Patent Application No. 10-2019-0108463, filed on Sep. 2, 2019, in the Korean Intellectual Property Office, the disclosure of which is incorporated by reference herein in its entirety.

BACKGROUND

1. Field

The disclosure relates to an electronic apparatus for controlling a passenger seat display in front of a passenger sitting on a passenger seat of a vehicle and a method of controlling the passenger seat display.

2. Description of Related Art

A vehicle is used as a main transportation in modern society. Recently, vehicles have displays inside. The displays can provide useful content related to the operation of the vehicle, as well as entertainment. The displays, however, can be a distraction to the driver which can be unsafe. Accordingly, driver and passenger safety are important considerations.

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, a method of controlling a passenger seat display of a vehicle, comprises: determining whether the vehicle is in motion; applying a driving voltage to a viewing angle switching element of the passenger seat display, when the vehicle is determined to be in motion, wherein the viewing angle switching element comprises a polymer dispersed liquid crystal (PDLC); and adjusting brightness or color coordinates of the passenger seat display to a predetermined target brightness value or a predetermined target color coordinate value, respectively, when the driving voltage is applied to the viewing angle switching element.

According to certain embodiments, detecting whether the vehicle is in motion comprises detecting at least one of a velocity of the vehicle, pressure applied to an accelerator of the vehicle, or an operation of a steering wheel of the vehicle.

According to certain embodiments, determining whether the vehicle is in motion comprises determining that the vehicle is in motion when detecting that a velocity of the vehicle exceeds a predetermined threshold velocity and determining that the vehicle is not in motion when detecting that the velocity of the vehicle is the predetermined threshold velocity or less.

According to certain embodiments, determining whether the vehicle is in motion comprises detecting whether there is operation of the steering wheel, the method further comprising: determining that the vehicle is in motion when detecting that there is operation of the steering wheel; and determining that the vehicle is not in motion when detecting that there is no operation of the steering wheel According to certain embodiments, applying the driving voltage comprises: applying the driving voltage to the viewing angle switching element when determining that the vehicle is in motion, and not applying the driving voltage to the viewing angle switching element when determining that the vehicle is not in motion.

According to certain embodiments, the driving voltage applied to the viewing angle switching element is an alternating current (AC) voltage.

According to certain embodiments, the adjusting of the brightness or the color coordinates of the passenger seat display comprises adjusting the brightness of the passenger seat display to the target brightness value based on an amount of brightness decrease that occurs as a result of the application of the driving voltage to the viewing angle switching element, by controlling a magnitude of a driving current applied to a light source of the passenger seat display.

According to certain embodiments, information about the amount of brightness decrease is stored in a memory in the vehicle.

According to certain embodiments, the adjusting of the brightness or the color coordinates of the passenger seat display comprises adjusting the color coordinates of the passenger seat display to the target color coordinate value based on an amount of change in the color coordinates that occurs as a result of the application of the driving voltage to the viewing angle switching element, wherein the color coordinates of the passenger seat display are adjusted by adjusting RGB output amounts through a timing control board (T-CON board) or an image board controlling an operation of the passenger seat display.

According to certain embodiments, information about the change in the color coordinate is stored in a memory in the vehicle.

According to certain embodiments, an electronic apparatus for controlling a passenger seat display of a vehicle comprises: the passenger seat display arranged on a dashboard of the vehicle in front of a passenger seat, the passenger seat display comprising a backlight unit (BLU), a viewing angle switching element comprising a polymer dispersed liquid crystal (PDLC), and a liquid crystal display panel; a sensor; a power supply configured to supply direct current (DC) power to the passenger seat display and the sensor; at least one processor connected to the power supply, sensor, and passenger seat display; and memory to connected to the processor storing one or more instructions executable by the at least one processor, wherein execution of the one or more instructions by the at least one processor causes the at least one processor to perform a plurality of operations, the plurality of operations comprising: determining whether the vehicle is in motion based on input from the sensor; controlling the power supply to apply a driving voltage to the viewing angle switching element, when the vehicle is in motion, and adjusting brightness or color coordinates of the passenger seat display to a predetermined target brightness value or a predetermined target color coordinate value, respectively when the driving voltage is applied to the viewing angle switching element According to certain embodiments, the sensor comprises at least one of a velocity sensor configured to detect a velocity of the vehicle, an accelerator sensor configured to detect pressure applied to an accelerator of the vehicle, or a steering wheel sensor configured to detect an operation of a steering wheel of the vehicle.

According to certain embodiments, the sensor comprises a velocity sensor, and the plurality of operations further comprises: determining that the vehicle is in motion when the velocity sensor detects that a velocity of the vehicle exceeds a predetermined threshold velocity; and determining that the vehicle is not in motion when the velocity sensor detects that the velocity of the vehicle is the preset threshold speed or less.

According to certain embodiments, the sensor comprises a steering wheel sensor configured to detect the operation of the steering wheel, and the plurality of operations further comprises: determining that the vehicle is in motion when the steering wheel sensor detects operation of the steering wheel.

According to certain embodiments, the plurality of operations further comprises: controlling the power supply to apply the driving voltage to the viewing angle switching element when the vehicle is determined to be in motion, and controlling the power supply not to apply the driving voltage to the viewing angle switching element when the vehicle is determined to not be in motion.

According to certain embodiments, the electronic apparatus further comprises a DC-AC (Alternating Current) converter configured to convert the DC power output from the power supply into AC power, wherein the driving voltage applied to the viewing angle switching element is an AC voltage resulting from conversion by the DC-AC converter.

According to certain embodiments, the electronic apparatus further comprises a storage storing information about the amount of brightness decrease of the passenger seat display between when the driving voltage is applied and is not applied to the viewing angle switching element, and wherein the plurality of operations further comprises: adjusting the brightness of the passenger seat display to the target brightness value by using the information about the amount of brightness value decrease.

According to certain embodiments, the plurality of operations further comprise controlling the power supply to change a magnitude of a driving current applied to a light source of the BLU by the power supply, thereby adjusting the brightness of the passenger seat display.

According to certain embodiments, the electronic apparatus further comprising a storage storing information about the change in the color coordinate of the passenger seat display when the driving voltage is applied or is not applied to the viewing angle switching element, and wherein the plurality of operations further comprises adjusting the color coordinates of the passenger seat display to the target color coordinate value by using the information about the change in the color coordinate.

According to certain embodiments, the plurality of operations further comprise adjusting the color coordinates of the passenger seat display by adjusting RGB output amounts through a timing control board (T-CON board) or an image board for controlling an operation of the passenger seat display.

According to certain embodiments, a passenger seat display arranged on a dashboard of a vehicle and in front of a passenger seat of the vehicle comprises: a liquid crystal display panel; a viewing angle switching element comprising a polymer dispersed liquid crystal (PDLC); and a backlight unit (BLU), wherein the BLU comprises: a light emitting diode (LED) light source; a light guide plate (LGP) configured to deliver light to the liquid crystal panel by changing a path of light incident from the LED light source; a reflective member adjacent to a first surface of the LGP and configured to re-reflect the light reflected through the LGP; and a prism plate adjacent to a second surface of the LGP and comprising a plurality of prism patterns protruding in an inverted triangle shape in a direction facing the second surface of the LGP.

According to certain embodiments, the reflective member includes silver.

According to certain embodiments, the LGP and the reflective member are separated by a preset distance, and the passenger seat display further comprises a plurality of connection members between the first surface of the LGP and an upper surface of the reflective member.

According to certain embodiments, a plurality of lenticular patterns having a certain width in a first direction, extend in a second direction, and protrude by a certain height in a height direction are formed on the second surface of the LGP.

According to certain embodiments, a plurality of lenticular patterns are separated by a preset distance therebetween.

According to certain embodiments, at least one of protruding surfaces of the plurality of prism patterns is formed in a multi-surface structure having different angles of inclination with respect to a horizontal plane.

BRIEF DESCRIPTION OF THE DRAWINGS

The above and other aspects, features, and advantages of certain embodiments of the disclosure will be more apparent from the following description taken in conjunction with the accompanying drawings, in which:

The disclosure could be easily understood by the following detailed description taken in conjunction with the accompanying drawings.

FIG. 8 illustrates adjusting color coordinates of a passenger seat display, according to an embodiment of the disclosure;

DETAILED DESCRIPTION

Figure 1:
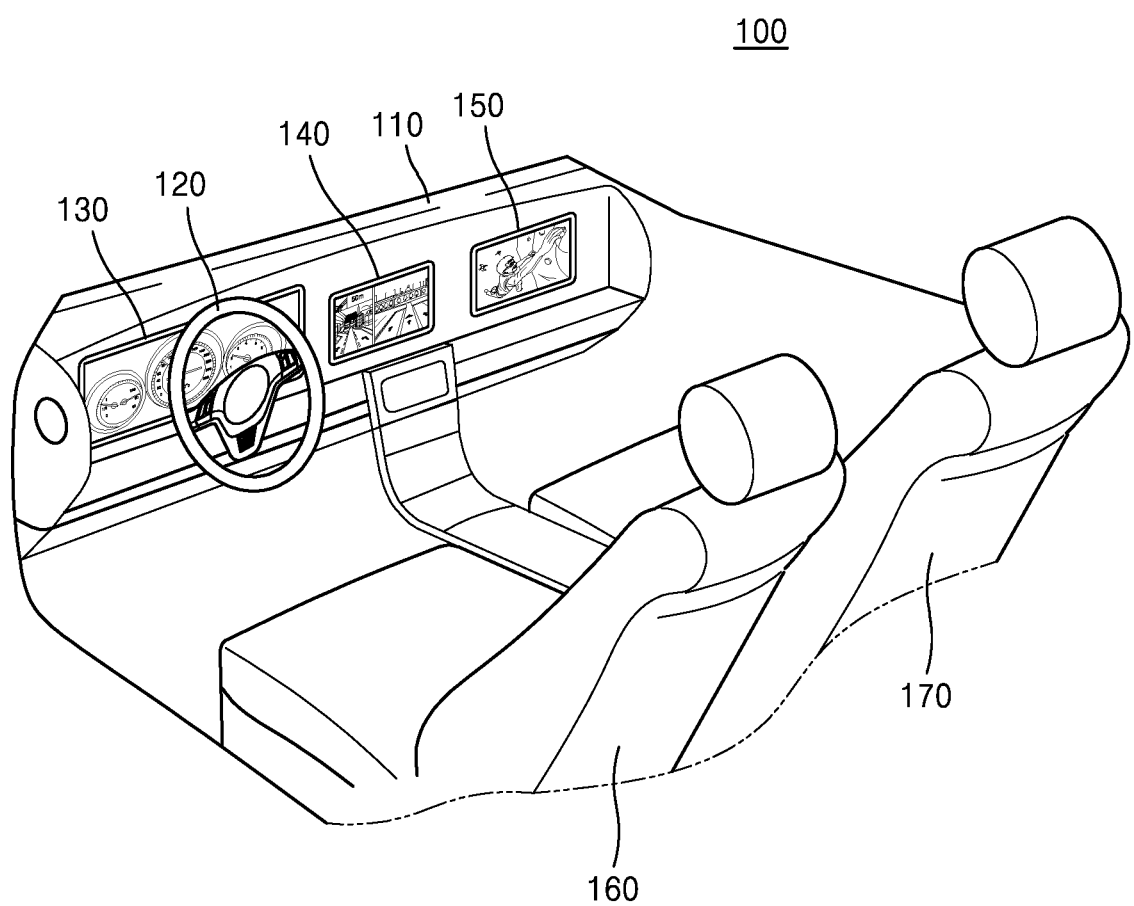
FIG. 1 illustrates an internal structure of a vehicle.

The terms used in the embodiments of the disclosure are those general terms currently widely used in the art while considering the functions of the disclosure, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be defined not as simple names but based on the meaning of the terms and the overall description.

An expression in the singular includes an expression in the plural unless they are clearly different from each other in context. All terms used herein including technical or scientific terms have the same meaning as those generally understood by those of ordinary skill in the art to which the specification belongs.

Throughout the specification, when a certain part "includes" a certain component, this indicates that the part may further include another component instead of excluding another component unless there is different disclosure. In addition, terms such as " . . . unit" and " . . . module" used in the specification refer to units that perform at least one function or operation, and the units may be implemented as hardware or software or as a combination of hardware and software.

Throughout the disclosure, the expression "at least one of a, b or c" indicates only a, only b, only c, both a and b, both a and c, both b and c, all of a, b, and c, or variations thereof.

The expression "configured to" used in the specification may be exchanged with, for example, "suitable for", "having the capacity to", "designed to", "adapted to", "made to", or "capable of" in accordance with circumstances. The term "configured to" does not necessarily indicate only "specifically designed to" in terms of hardware. Instead, in a certain circumstance, the expression "a system configured to" may indicate the system "capable of" together with another device or components. For example, "a processor configured to perform A, B, and C" may indicate an exclusive processor (e.g., an embedded processor) configured to perform a corresponding operation or a generic-purpose processor (e.g., a central processing unit (CPU) or an application processor) capable of performing corresponding operations by executing one or more software programs stored in a memory.

Hereinafter, embodiments of the disclosure will be described in detail with reference to the accompanying drawings so that those of ordinary skill in the art to which the disclosure belongs may easily realize the disclosure. However, the disclosure may be embodied in many different forms and should not be construed as being limited to the embodiments of the disclosure set forth herein.

A passenger seat display can be in front of a passenger seat (frontmost seat, except for the driver's seat) in the vehicle. It may be permissible for the driver view a passenger seat display, when the vehicle is not in motion, or stopped. However, the driver should not view the passenger seat display when the vehicle is in motion. In addition, according to the traffic regulations, except for special purpose content such as path guide navigation, a driver should be inhibited from viewing content while driving.

It is therefore desirable to provide a technique where a passenger sitting on a passenger seat may view content being displayed on a passenger seat display and the driver is prevented from viewing the content being displayed on the passenger seat display when the vehicle is in motion. In addition, to provide a pleasant viewing environment to a passenger sitting on a passenger seat, it is needed to perform control such that the passenger sitting on the passenger seat does not perceive brightness or color change while a vehicle is switching between in motion, and not in motion.

An embodiment of the disclosure relates to an electronic apparatus for controlling a passenger seat display and a method of controlling the passenger seat display. More particularly, an electronic apparatus and a control method changes a viewing angle of a passenger seat display and adjusts pixels of the passenger seat display based on whether the vehicle is in motion.

Provided, according to an embodiment of the disclosure, is a structure of a backlight unit for increasing light-gathering power to improve brightness of a passenger seat display.

Additional aspects will be set forth in part in the description which follows and, in part, will be apparent from the description, or may be learned by practice of the presented embodiments of the disclosure.

Hereinafter, the embodiments of the disclosure will be described in detail with reference to the accompanying drawings.

FIG. 1 illustrates an internal structure of a vehicle 100 that includes a passenger seat display 150. Referring to FIG. 1, the vehicle 100 may include a dashboard 110, a steering wheel 120, a cluster 130, a center information display (CID) 140, a passenger seat display 150, a driver seat 160, and a passenger seat 170. The dashboard 110 is in the front of the driver seat 160 and the passenger seat 170. Instrument devices and control buttons required to drive the vehicle 100 may be mounted on the dashboard 110. The cluster 130, the center display 140, and the passenger seat display 150 may be mounted on the dashboard 110. According to an embodiment of the disclosure, the dashboard 110 may include an instrument panel including instrument devices and control buttons, and a centerfacia arranged between the driver seat 160 and the passenger seat 170 and having an air conditioner and an audio device.

The cluster 130 may be mounted on the dashboard 110 and arranged in the front of the driver seat 160. The cluster 130 may display information about at least one of a traveling speed of the vehicle 100, engine revolutions per minute (RPM), a fuel capacity, or a coolant temperature gauge. The cluster 130 may include a needle and a speedometer plate which are hardware components, but is not limited thereto. The cluster 130 may include a display device covering the entire area thereof.

The CID 140 may be on the dashboard 110 and between the driver seat 160 and the passenger seat 170. The CID 140 may display a path guide navigation image up to a destination, display vehicle related information, or display image content.

The passenger seat display 150 may be on the dashboard 110 and in the front of the passenger seat 170. Although FIG. 1 shows that the passenger seat display 150 is separated by a certain distance from the CID 140, the present embodiment of the disclosure is not limited thereto. The passenger seat display 150 may be formed together with the CID 140. According to an embodiment of the disclosure, the cluster 130, the CID 140, and the passenger seat display 150 may be formed in one body.

The passenger seat display 150 may provide image content to a passenger sitting on the passenger seat 170. According to an embodiment of the disclosure, the passenger seat display 150 may display image content such as movie, or drama. According to another embodiment of the disclosure, the passenger seat display 150 may display content linked to a smartphone of a passenger or be wirelessly connected to the smartphone to display a user interface (UI) image screen on which a function of calling, texting, application executing, or the like is performed.

The passenger seat display 150 may include a physical device including at least one of, for example, a liquid crystal display (LCD), a plasma display panel (PDP) display, an organic light emitting diode (OLED) display, a field emission display (FED), a vacuum fluorescent display (VFD), a digital light processing (DLP) display, a flat panel display, a three-dimensional (3D) display, or a transparent display, but is not limited thereto. According to an embodiment of the disclosure, the passenger seat display 150 may include a touchscreen including a touch interface.

The viewing angle of a passenger seat display 150 can be adjusted based on whether the vehicle is in motion. In certain embodiments, the viewing angle of the passenger seat display 150 can be adjusted to be wide enough for the driver to be able to view the content on the passenger seat display 150 when the vehicle is not in motion. However, when the vehicle is in motion, the viewing angle of the passenger seat display 150 is narrowed to prevent viewing by the driver. Additionally, pixels of the passenger seat display are adjusted based on whether the vehicle is in motion so that the passenger does not perceive differences in color or brightness due to ambient light differences between when the vehicle is in motion and when the vehicle is not in motion. Additionally, the passenger seat display 150 includes a backlight unit for increasing light-gathering power to improve brightness of the passenger seat display.

Figure 2A:
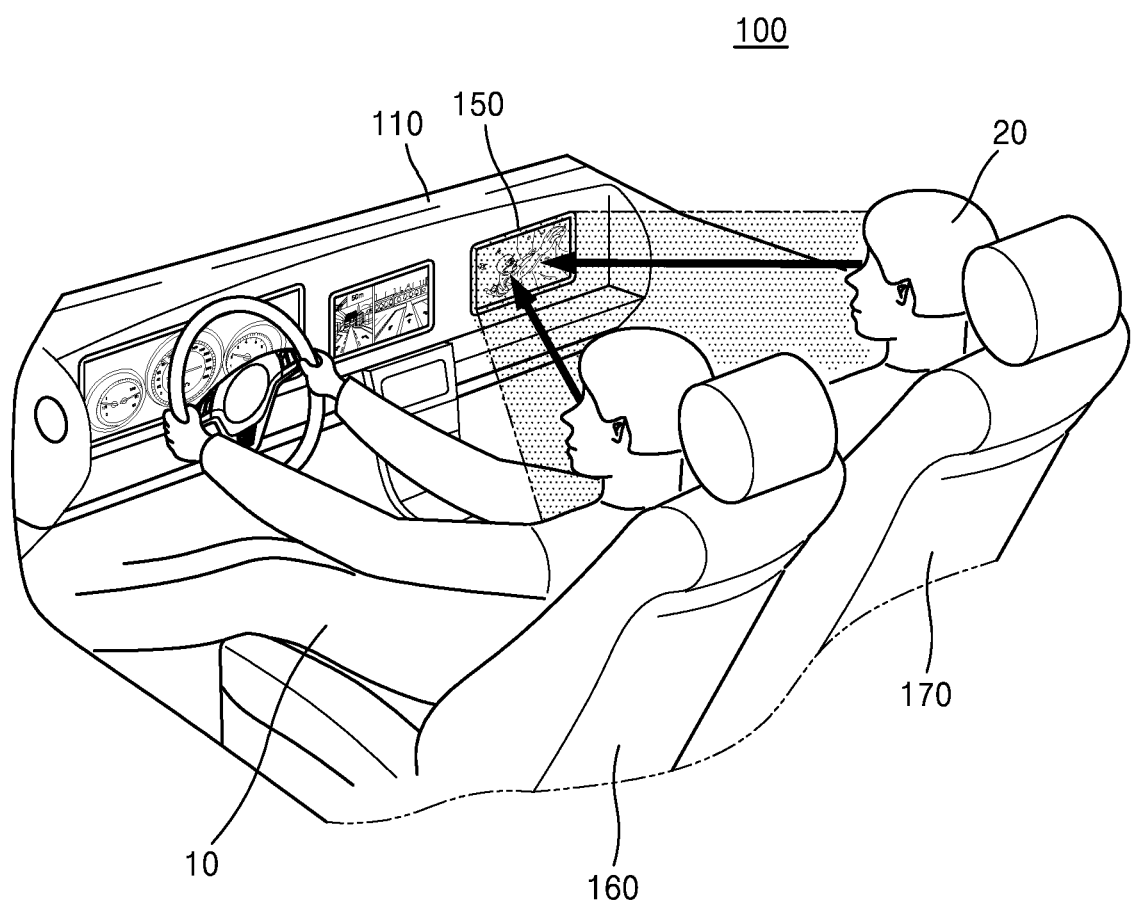
FIG. 2A illustrates a viewing angle of a passenger seat display according to a operating mode.
Figure 2B:
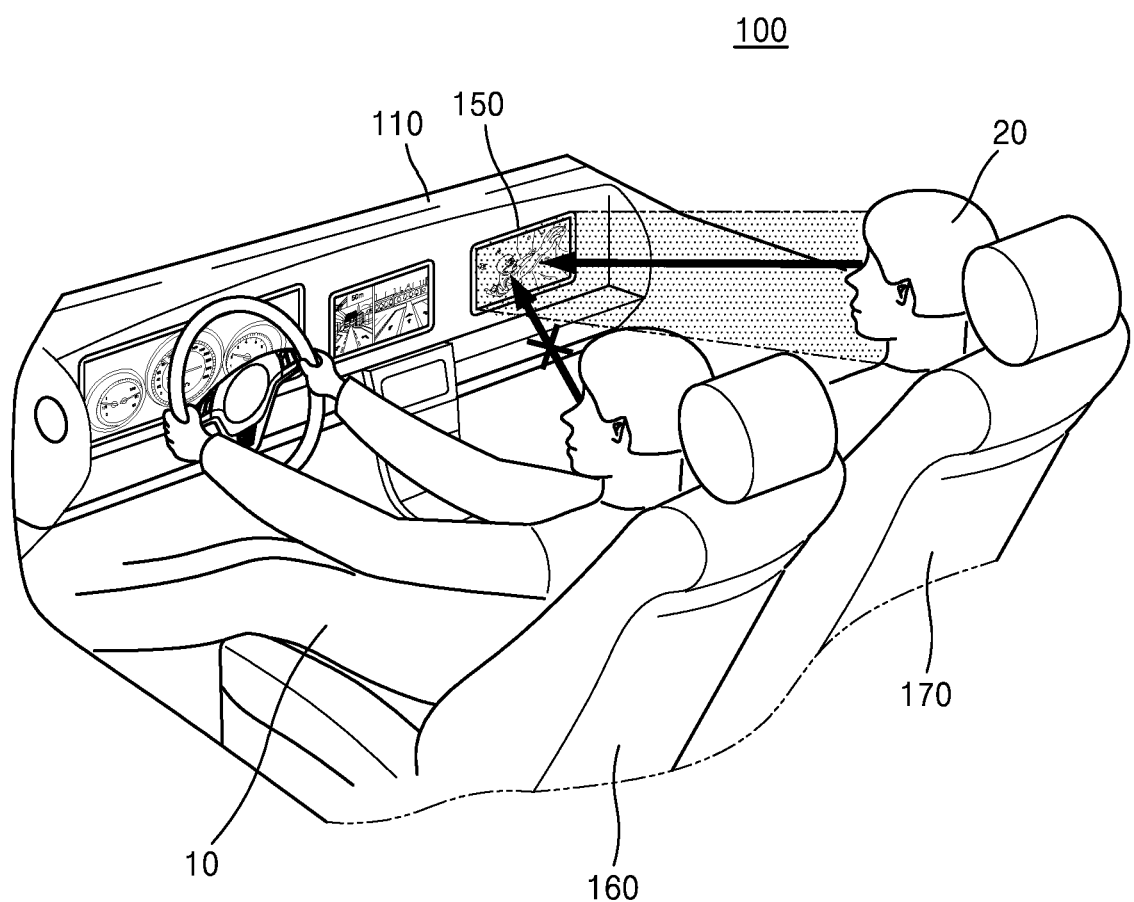
FIG. 2B illustrates a viewing angle of a passenger seat display according to a operating mode.

FIGS. 2A and 2B illustrate viewing angles of the passenger seat display 150 according to a operating mode.

Referring to FIG. 2A, when the vehicle is not in motion (which includes and can be considered and includes a Stop Mode), the passenger seat display 150 may display image content at a wide viewing angle. The stop mode or "not in motion" indicates that the vehicle is not driven by a driver (such as when an internal combustion engine (ICE) is not in ignition, or when the ICE is in ignition and the gear is in park), or is running at a reference speed or less. "Not in motion" or stop mode indicates a case in which a vehicle completely stops after motion, such as at a traffic light or a stop sign, but is not limited thereto. According to an embodiment of the disclosure, "not in motion" or the stop mode may indicate a speed of 0 to 5 miles/hour.

In the stop mode, the passenger seat display 150 may display image content at the wide viewing angle, and accordingly, both a driver 10 and a passenger 20 may view the image content displayed on the passenger seat display 150. In a wide viewing angle mode, light emitted from the passenger seat display 150 is diffused light, and accordingly, not only the passenger 20 located in the front of the passenger seat display 150 but also the driver 10 located in an inclined direction with respect to the front of the passenger seat display 150 may view the image content.

Referring to FIG. 2B, when the vehicle is in motion (which be considered and include a driving mode), the passenger seat display 150 may display image content at a narrow viewing angle. "In motion" and the driving mode indicates that a driver drives a vehicle. According to an embodiment of the disclosure, the "in motion" and the driving mode may indicate that a vehicle is running at a speed exceeding 5 miles/hour.

In the driving mode, the passenger seat display 150 may display image content at the narrow viewing angle such that the driver 10 is prevented from viewing the image content displayed on the passenger seat display 150. In the driving mode, only the passenger 20 may view the image content displayed on the passenger seat display 150. In a narrow viewing angle mode, light emitted from the passenger seat display 150 is collimated light in a form of being concentrated to the front, and accordingly, only the passenger 20 located in the front of the passenger seat display 150 may view the image content displayed on the passenger seat display 150. In the narrow viewing angle mode, the driver 10 located in an inclined direction with respect to the front of the passenger seat display 150 is prevented from viewing the image content displayed on the passenger seat display 150.

As shown in FIGS. 2A and 2B, the passenger seat display 150 switches the wide viewing angle and the narrow viewing angle in each of the stop mode and the driving mode, and the switching may be implemented by arranging a viewing angle switching element between a backlight unit (BLU) and a display panel. According to an embodiment of the disclosure, the viewing angle switching element may include a polymer dispersed liquid crystal (PDLC). An electronic apparatus may switch the wide viewing angle mode and the narrow viewing angle mode by controlling a driving voltage applied to the viewing angle switching element. The switching of the wide viewing angle mode and the narrow viewing angle mode will be described in detail with reference to FIG. 3.

Figure 3:
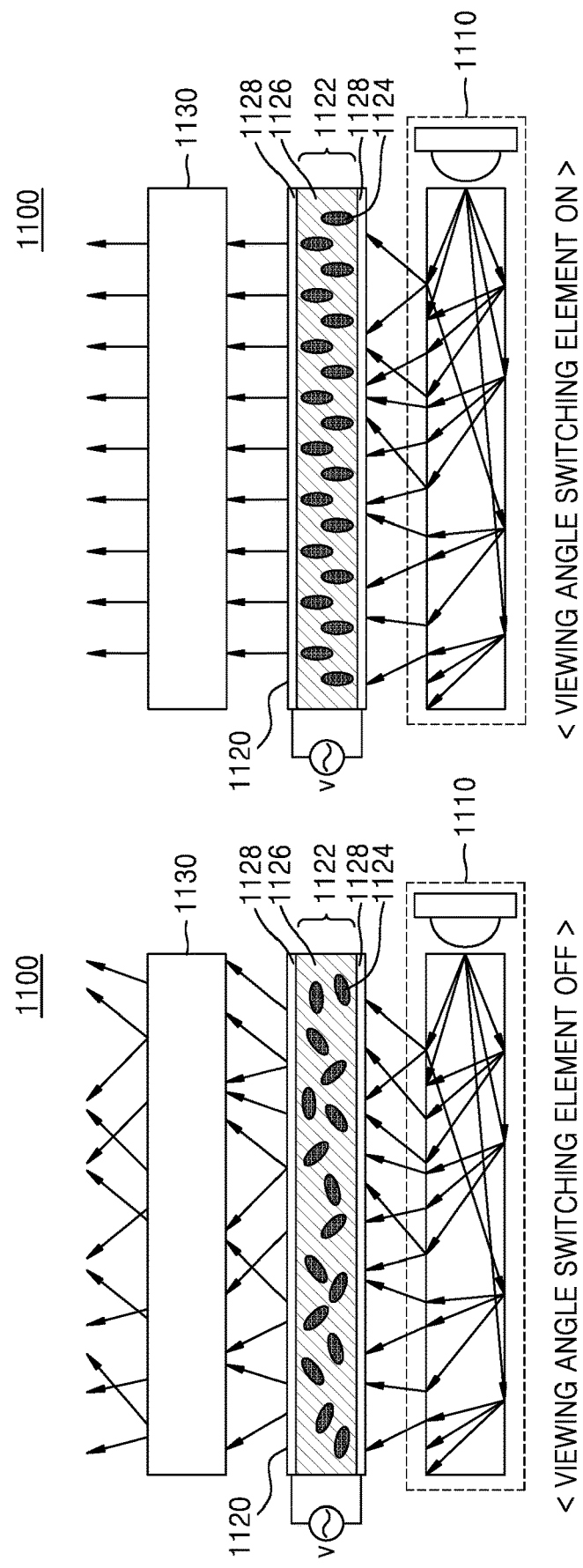
FIG. 3 is a cross-sectional view of a passenger seat display according to an embodiment of the disclosure.

FIG. 3 is a cross-sectional view of a passenger seat display 1100 according to an embodiment of the disclosure. The passenger seat display 1100 on the left has a wider viewing angle which may be suitable when the vehicle is in stop mode. While the passenger seat display 1100 on the right has a narrower viewing angle which can be used when the vehicle is in driving mode.

Referring to FIG. 3, the passenger seat display 1100 may include a BLU 1110, a viewing angle switching element 1120, and an LCD panel 1130.

Figure 10:
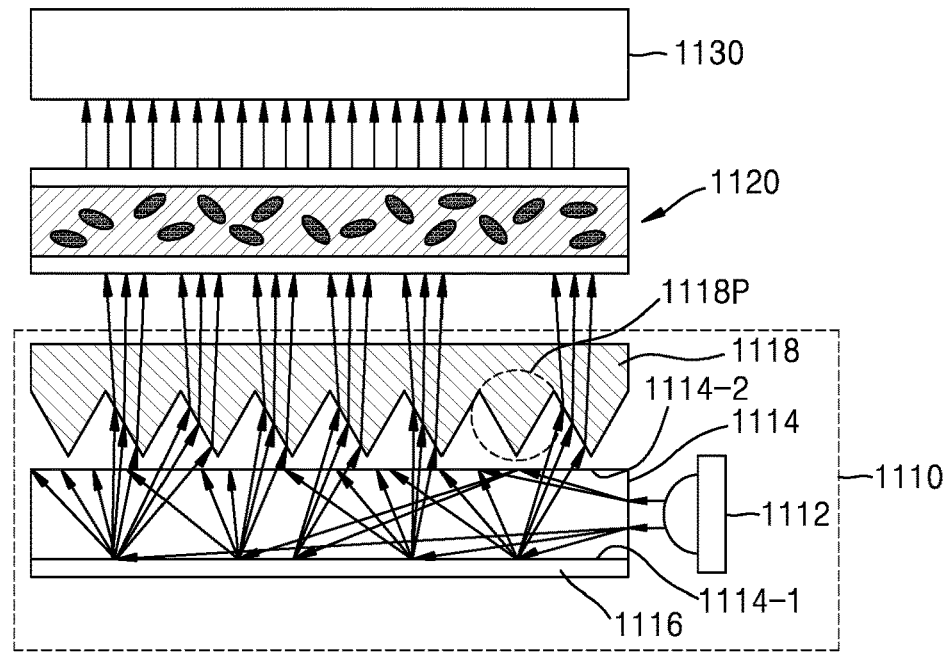
FIG. 10 is a cross-sectional view of a passenger seat display according to an embodiment of the disclosure.

The BLU 1110 may include a light source 1112 (see FIG. 10), a light guide plate (LGP) 1114 (see FIG. 10), and a reflective member 1116 (see FIG. 10). A structure of the BLU 1110 will be described in detail with reference to FIG. 10.

The LCD panel 1130 may include a thin-film transistor (TFT)-LCD panel including liquid crystal molecules and a color filter.

The viewing angle switching element 1120 may be between the BLU 1110 and the LCD panel 1130. The viewing angle switching element 1120 may change a viewing angle of light passing through the LCD panel 1130 by changing directivity of light emitted from the BLU 1110 according to a driving voltage applied from a power supply V. According to an embodiment of the disclosure, the viewing angle switching element 1120 may include a PDLC.

Herein, the power supply V may apply an alternating current (AC) voltage but is not limited thereto.

According to an embodiment of the disclosure, the viewing angle switching element 1120 may include a PDLC layer 1122 and a transparent electrode 1128. The PDLC layer 1122 may include liquid crystal molecules 1124 dispersed in a polymer support medium 1126. A pair of transparent electrodes 1128 may be on an upper surface and a lower surface of the PDLC layer 1122, respectively. The pair of transparent electrodes 1128 may include polyethylene terephthalate (PET) but is not limited thereto.

The viewing angle switching element 1120 may change an alignment direction of the liquid crystal molecules 1124 in response to a driving voltage applied from the power supply V to the pair of transparent electrodes 1128 to change a degree of dispersion of light passing toward the LCD panel 1130, thereby switching a viewing angle of the light.

In the embodiment of the disclosure shown in FIG. 3, viewing angle switching element OFF indicates that the power supply V does not apply a driving voltage to the viewing angle switching element 1120. In a viewing angle switching element OFF state, the liquid crystal molecules 1124 in the PDLC layer 1122 may be arranged at different angles without a determined angle. In this case, the PDLC layer 1122 is transparent, and light incident from the BLU 1110 is scattered by penetrating through the viewing angle switching element 1120. The light incident to the LCD panel 1130 by penetrating through the viewing angle switching element 1120 is scattered, and light emitted from the LCD panel 1130 is diffused light, such that the passenger seat display 1100 may display image content at the wide viewing angle. That is, in the viewing angle switching element OFF state, the passenger seat display 1100 may operate in the wide viewing angle mode, and not only a passenger sitting on a passenger seat but also a driver may view the image content displayed on the passenger seat display 1100.

Viewing angle switching element ON indicates that the power supply V applies a driving voltage to the viewing angle switching element 1120. In a viewing angle switching element ON state, the power supply V applies the driving voltage to the PDLC layer 1122 through the pair of transparent electrodes 1128, and accordingly, all the liquid crystal molecules 1124 in the PDLC layer 1122 may be aligned in the same direction. For example, when the driving voltage is applied through the transparent electrodes 1128, the liquid crystal molecules 1124 may be arranged in parallel in a height direction. In this case, a front part of the viewing angle switching element 1120 may be transparent, but when the passenger seat display 1100 is viewed at a side surface, the viewing angle switching element 1120 may be opaque. Light incident from the BLU 1110 may be collimated light having a constant directivity by being concentrated while penetrating through the viewing angle switching element 1120. The collimated light may penetrate through the LCD panel 1130 such that the passenger seat display 1100 displays image content. That is, in the viewing angle switching element ON state, the passenger seat display 1100 may operate in the narrow viewing angle mode, and only a passenger sitting on a passenger seat may view the image content. In the viewing angle switching element ON state, a driver is prohibited from viewing the image content displayed on the passenger seat display 1100.

In the embodiment of the disclosure shown in FIG. 3, when a driving voltage is applied to the viewing angle switching element 1120 (viewing angle switching element ON) or is not applied to the viewing angle switching element 1120 (viewing angle switching element OFF), brightness and color coordinates of the passenger seat display 1100 may be changed. A method of correcting brightness and color coordinates of the passenger seat display 1100, which are changed in response to a driving voltage applied to the viewing angle switching element 1120, will be described in detail with reference to FIGS. 7 to 9.

Accordingly, the passenger vehicle display with the wider viewing angle in the stop mode, and the narrow viewing angle in the driving mode can occur applying the driving voltage to the viewing angle switching element 1120 when the vehicle is determined to be in the driving mode. At least one processor can use a sensor input to determine whether the vehicle is in the driving mode or the stop mode. Accordingly, the at least one processor can control the power supply to selectively apply the driving voltage to the angle switching element 1120 based on the sensor input.

Figure 4:
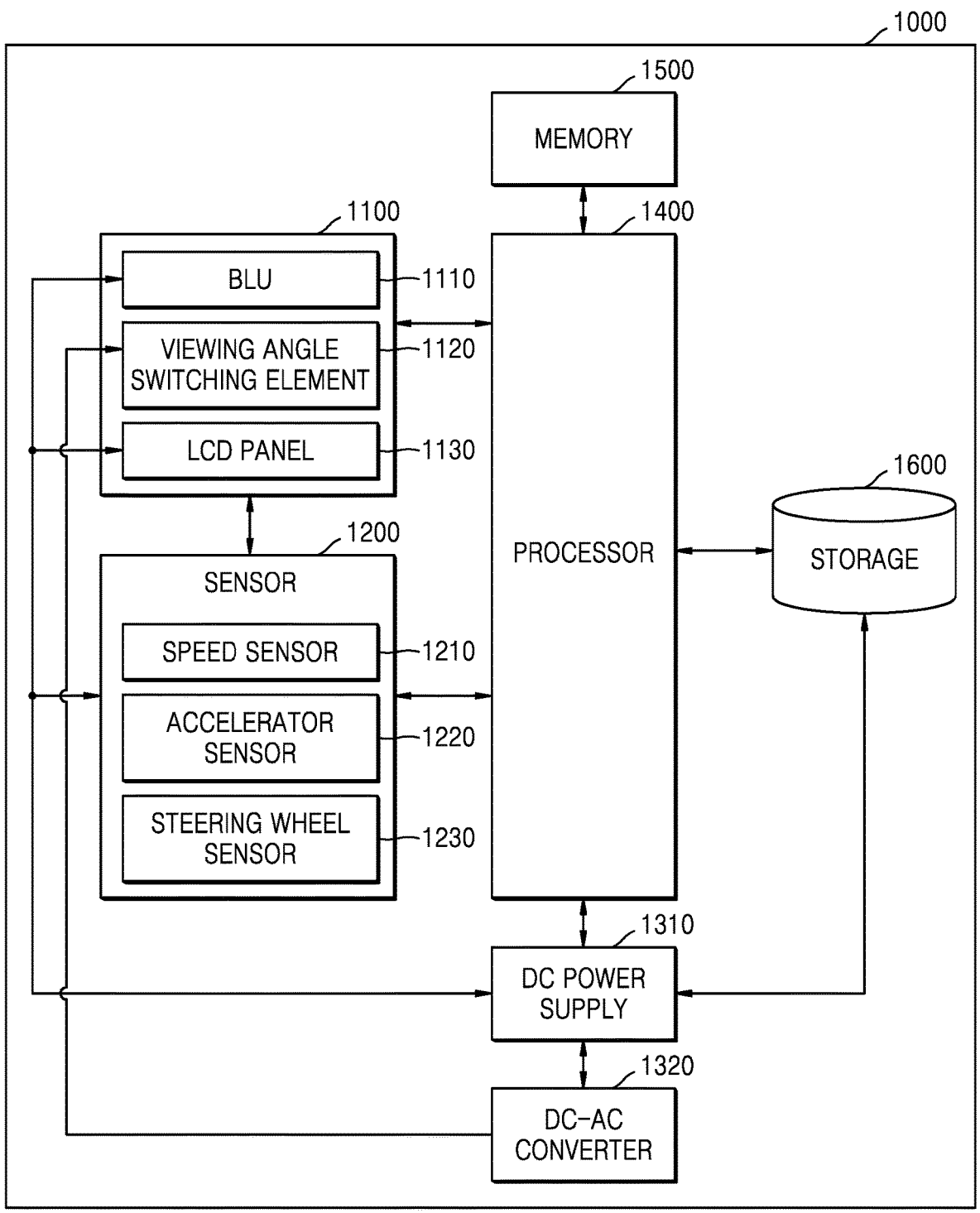
FIG. 4 is a block diagram of an electronic apparatus for controlling a passenger seat display, according to the disclosure.

FIG. 4 is a block diagram of an electronic apparatus 1000 for controlling a passenger seat display, according to the disclosure.

Referring to FIG. 4, the electronic apparatus 1000 may include the passenger seat display 1100, a sensor 1200, a DC power supply 1310, a DC-AC converter 1320, a processor 1400, a memory 1500, and a storage 1600. According to an embodiment of the disclosure, the passenger seat display 1100, the DC power supply 1310, and the DC-AC converter 1320 may not be components of the electronic apparatus 1000 but be separate components. According to certain embodiments, the processor 1400 can use an input from the sensor 1200 to determine whether the vehicle is in the stop mode or the driving mode. When the processor 1400 determines that the vehicle is in the driving mode, the processor 1400 controls a DC power supply 1310 (in combination with the DC-AC converter) to apply a driving voltage to the passenger display device 110. When the processor 1400 determines that the vehicle is in the stop mode, the processor 1400 causes the driving voltage to not be applied to the passenger display device 110.

The sensor 1200 may detect an operating state of a vehicle being driven by a driver. The sensor 1200 may include a velocity sensor 1210, an accelerator (pedal) sensor 1220, and a steering wheel sensor 1230. According to an embodiment of the disclosure, the sensor 1200 may include at least one of the velocity sensor 1210, the accelerator sensor 1220, or the steering wheel sensor 1230. However, the present embodiment of the disclosure is not limited thereto, and the sensor 1200 may further include a global positioning system (GPS), an inertial measurement unit (IMU), a radar detection and ranging (RADAR) sensor, a light detection and ranging (LIDAR) sensor, and an image sensor. In addition, the sensor 1200 may include at least one of a temperature/humidity sensor, an infrared sensor, an atmospheric pressure sensor, a proximity sensor, or an RGB sensor (illuminance sensor).

The velocity sensor 1210 may detect a velocity of a vehicle. The velocity sensor 1210 may measure a real-time velocity and provide data about the measured velocity to the processor 1400. The velocity sensor 1210 may obtain data about a change in a velocity of the vehicle over time. According to an embodiment of the disclosure, the velocity sensor 1210 may detect a velocity of the vehicle when the velocity of the vehicle is a preset velocity or higher. For example, the preset velocity may be 5 miles/hour. According to an embodiment of the disclosure, when the velocity sensor 1210 is configured to detect a velocity only when the velocity is the preset velocity or higher, the preset velocity may be determined based on a user input. In certain embodiments, the velocity sensor can sense the revolution per minute (RPM) and the gear to determine the velocity of the vehicle or receive data from a speedometer.

The accelerator sensor 1220 may detect pressure applied to an accelerator of the vehicle (accelerator pedal) when a driver steps on the accelerator with a foot. The accelerator sensor 1220 may include a pressure sensor. The accelerator sensor 1220 may measure a pressure value applied to the accelerator and provide measured pressure value data to the processor 1400. The accelerator sensor 1220 may be connected to the accelerator and be adjacent to the accelerator but is not limited thereto. According to an embodiment of the disclosure, when pressure greater than or equal to preset pressure is applied to the accelerator, the accelerator sensor 1220 may detect the pressure applied to the accelerator and provide the measured pressure value to the processor 1400.

The steering wheel sensor 1230 may detect whether the driver operates a steering wheel. The steering wheel sensor 1230 may be attached to the steering wheel but is not limited thereto. The steering wheel sensor 1230 may detect at least one of a rotating angle, a rotating velocity, a rotating direction, a number of times the rotating direction is switched, a steering angle, or a number of times a steering direction of the steering wheel is switched.

The rotating angle of the steering wheel indicates a degree of change in a steering direction of the steering wheel. The steering wheel sensor 1230 may obtain a rotating velocity by detecting a rotating angle and dividing a change amount of the detected rotating angle by a unit time.

Rotating direction switching of the steering wheel indicates that a rotating direction of the steering wheel switches from a clockwise direction to a counter clockwise direction or vice versa. The steering wheel sensor 1230 may detect rotating direction switching of the steering wheel by an operation of the driver. According to an embodiment of the disclosure, the steering wheel sensor 1230 may monitor rotating direction switching of the steering wheel by an operation of the driver and measure a number of times a rotating direction of the steering wheel is switched per unit time.

The steering angle of the steering wheel may indicate an angle generated according to rotation of the steering wheel based on a steering direction of the steering wheel when a traveling direction of the vehicle is a forward direction The steering wheel sensor 1230 may detect a change in the steering angle of the steering wheel by an operation of the driver.

Steering direction switching of the steering wheel indicates that a steering direction switches from right to left or vice versa according to an operation of the steering wheel. The steering wheel sensor 1230 may monitor steering direction switching of the steering wheel by an operation of the driver and detect a number of times the steering direction is switched per unit time.

The passenger seat display 1100 may include the BLU 1110, the viewing angle switching element 1120, and the LCD panel 1130. The BLU 1110 may include the light source 1112 (see FIG. 10), the LGP 1114 (see FIG. 10), and the reflective member 1116 (see FIG. 10). The BLU 1110 may deliver light emitted from the light source 1112 to the viewing angle switching element 1120.

The viewing angle switching element 1120 may be between the BLU 1110 and the LCD panel 1130. The viewing angle switching element 1120 may change a viewing angle of light passing through the LCD panel 1130 by changing directivity of light delivered from the BLU 1110 according to a driving voltage applied from DC-AC converter 1320.

According to an embodiment of the disclosure, the viewing angle switching element 1120 may include a PDLC. The viewing angle switching element 1120 may include liquid crystal molecules 1124 dispersed in the polymer support medium 1126 (see FIG. 3). The viewing angle switching element 1120 of FIG. 4 is the same as the viewing angle switching element 1120 of FIG. 3, and thus, the description made with reference to FIG. 3 is not repeated herein.

The LCD panel 1130 may include a TFT-LCD panel including liquid crystal molecules and a color filter.

The DC power supply 1310 supplies DC power to components of the electronic apparatus 1000. The DC power supply 1310 may supply DC power to the passenger seat display 1100, the sensor 1200, the processor 1400, and the storage 1600. According to an embodiment of the disclosure, the DC power supply 1310 may supply DC power only to the BLU 1110 and the LCD panel 1130 of the passenger seat display 1100.

The DC-AC converter 1320 converts DC into AC. The DC-AC converter 1320 may convert the DC power output from the DC power supply 1310 into AC power. The DC-AC converter 1320 may apply the converted AC power to the viewing angle switching element 1120.

In certain embodiments, the processor can transmit one control signal to the DC power supply 1310 to cause application of the driving voltage, and another signal to prevent or stop application of the driving voltage.

The processor 1400 may control functions or operations of the passenger seat display 1100, the sensor 1200, the DC power supply 1310, the DC-AC converter 1320, and the storage 1600 by executing one or more instructions of a program stored in the memory 1500. The processor 1400 may include hardware components for performing arithmetic, logic, and input/output operations and signal processing. The processor 1400 may include at least one of, for example, a CPU, a microprocessor, an application processor, a graphics processing unit, application specific integrated circuits (ASICs), digital signal processors (DSPs), digital signal processing devices (DSPDs), programmable logic devices (PLDs), or field programmable gate arrays (FPGAs) but is not limited thereto. It shall also be understood that the electronic apparatus can include multiple processors 1000. Accordingly, "processor" shall be understood to collectively refer to both the single and plural contexts, hereinafter.

A program including instructions for controlling components of the electronic apparatus 1000 may be stored in the memory 1500. Instructions and program code readable by the processor may be stored in the memory 1500. In the embodiments of the disclosure below, the processor 1400 may execute instructions or codes of the program stored in the memory 1500, causing the processor to perform various operations. The memory 1500 may include at least one of, for example, random access memory (RAM) static random access memory (SRAM), read-only memory (ROM), electrically erasable programmable read-only memory (EEPROM), programmable read-only memory (PROM), a magnetic memory, a magnetic disc, or an optical disc.

The processor 1400 may obtain an input of information about an operating state of the vehicle from the sensor 1200 and determine an operating mode of the vehicle based on the obtained operating state information. The processor 1400 may determine any one mode of the operating mode including the driving mode and the stop mode based on the operating state of the vehicle, which is detected by the sensor 1200. That is, the processor may determine whether the vehicle is in motion based on input from a sensor. According to an embodiment of the disclosure, the processor

1400 may determine the operating mode of the vehicle as the driving mode when a velocity of the vehicle, which is detected by the velocity sensor 1210, exceeds a preset threshold velocity and determine the operating mode of the vehicle as the stop mode when the detected velocity of the vehicle is the preset threshold velocity or less. For example, the threshold velocity may be 5 miles/hour but is not limited thereto.

According to an embodiment of the disclosure, when pressure applied to the accelerator is detected by the accelerator sensor 1220, the processor 1400 may determine the operating mode of the vehicle as the driving mode. According to an embodiment of the disclosure, when a pressure value measured by the accelerator sensor 1220 is a preset reference pressure value or more, the processor 1400 may determine the operating mode of the vehicle as the driving mode.

According to an embodiment of the disclosure, the processor 1400 may obtain, from the steering wheel sensor 1230, information about whether the driver operates the steering wheel and determine the operating mode of the vehicle based on the obtained information about whether driver operates the steering wheel. For example, at least one of a rotating angle change, a rotating velocity, a rotating direction change, rotating direction switching, a steering angle change, or a steering direction switch of the steering wheel is detected by the steering wheel sensor 1230, the processor 1400 may determine the operating mode of the vehicle as the driving mode, and when an operation of the steering wheel is not detected, the processor 1400 may determine the operating mode of the vehicle as the stop mode. For example, when a rotating angle of the steering wheel, which is measured by the steering wheel sensor 1230, is a preset rotating angle reference value, the processor 1400 may determine the operating mode of the vehicle as the driving mode. For example, when a rotating velocity of the steering wheel, which is measured by the steering wheel sensor 1230, is a preset rotating velocity reference value, the processor 1400 may determine the operating mode of the vehicle as the driving mode. For example, when a number of times a rotating direction is switched per unit time, which is measured by the steering wheel sensor 1230, is a preset direction switching number reference value, the processor 1400 may determine the operating mode of the vehicle as the driving mode.

According to an embodiment of the disclosure, the processor 1400 may obtain information about a detected operating state from the sensor 1200 periodically according to a preset time interval and switch the operating mode of the vehicle to any one of the driving mode and the stop mode based on the obtained operating state information.

The processor 1400 may control the DC power supply 1310 to apply a driving voltage to the viewing angle switching element 1120 through the DC-AC converter 1320, based on the determined driving mode. According to an embodiment of the disclosure, when the operating mode of the vehicle is determined as the driving mode, the processor 1400 may control the DC power supply 1310 to apply the driving voltage to the viewing angle switching element 1120, and when the operating mode of the vehicle is determined as the stop mode, the processor 1400 may control the DC power supply 1310 not to apply the driving voltage to the viewing angle switching element 1120. When the driving voltage is applied to the viewing angle switching element 1120, the passenger seat display 1100 may operate in the narrow viewing angle mode, and when the driving voltage is not applied to the viewing angle switching element 1120, the passenger seat display 1100 may operate in the wide viewing angle mode. This will be described in detail with reference to FIG. 6.

It is noted that when the passenger seat display has a wide viewing angle, the light emitted is diffused light, while when the passenger seat display has a narrow viewing angle, light emitted is collimated light. As a result, when changing from the wide viewing angle to the narrow viewing angle, or vice versa, the brightness and color (color coordinates as will be described below) appear different. When the change occurs, the passenger may notice this change.

The processor 1400 may adjust brightness or color coordinates of the passenger seat display to a preset target brightness value or a preset target color coordinate value, respectively, when the driving voltage is applied to the viewing angle switching element. As a result, in certain embodiments, any change in brightness or color appearance resulting from narrowing the viewing angle is imperceptible to the human eye.

In certain embodiments, the passenger seat display 150 may include a plurality of pixels. Accordingly "adjusting brightness of the passenger seat display" may include adjusting the brightness of one or more or all the pixels of the passenger seat display. "Adjusting color coordinates of the passenger seat display" may include adjusting the color coordinates of one or more or all the pixels of the passenger seat display. In certain embodiments, the preset target brightness compensates for an amount of reduction in brightness of the passenger seat display 1100 that occurs when the viewing angle of the passenger seat display is narrowed. The target brightness value may be set by a user input but is not limited thereto. The preset target color coordinate value compensates for difference in color appearance that occurs when the viewing angle of the passenger seat display is narrowed. The target color coordinate value is a coordinate value in a Commission Internationale de l'Eclairage (CIE) XY chromaticity distribution table defined in an xyz color space of the CIE. The target color coordinate value may be set by a user input but is not limited thereto.

According to an embodiment of the disclosure, the processor 1400 may adjust the brightness of the passenger seat display 1100 to the target brightness value by using information about the brightness value decrease of the passenger seat display 1100 between when the driving voltage is applied to the viewing angle switching element 120 and when the driving voltage is not applied to the viewing angle switching element 1120. That is, the target brightness value is based on an amount of brightness decrease that occurs as a result of the application of the driving voltage to the viewing angle switching element. Information about the amount of brightness decrease and decrease rate between when the driving voltage is applied to the viewing angle switching element 1120 and when the driving voltage is not applied to the viewing angle switching element 1120 may be pre-stored in the storage 1600. The processor 1400 may control the DC power supply 1310 to change a magnitude of a driving current applied to the BLU 1110, thereby adjusting the brightness of the passenger seat display 1100.

According to an embodiment of the disclosure, the processor 1400 may adjust the color coordinates of the passenger seat display 1100 to the target brightness value by using information about a change amount of a color coordinate measurement value of the passenger seat display 1100 between when the driving voltage is applied to or is not applied to the viewing angle switching element 1120. That is, the target color coordinate value can be based on an amount of change in the color coordinates that occurs as a result of the application of the driving voltage to the viewing angle switching element. The processor 1400 may adjust the color coordinates of the passenger seat display 1100 by adjusting an RGB output amount through a timing control board (T-CON board) or an image board configured to control an operation of the LCD panel 1130 of the passenger seat display 1100.

A method, performed by the processor 1400, of adjusting the brightness or the color coordinates of the passenger seat display 1100 will be described in detail with reference to FIGS. 7 to 9.

Figure 5:
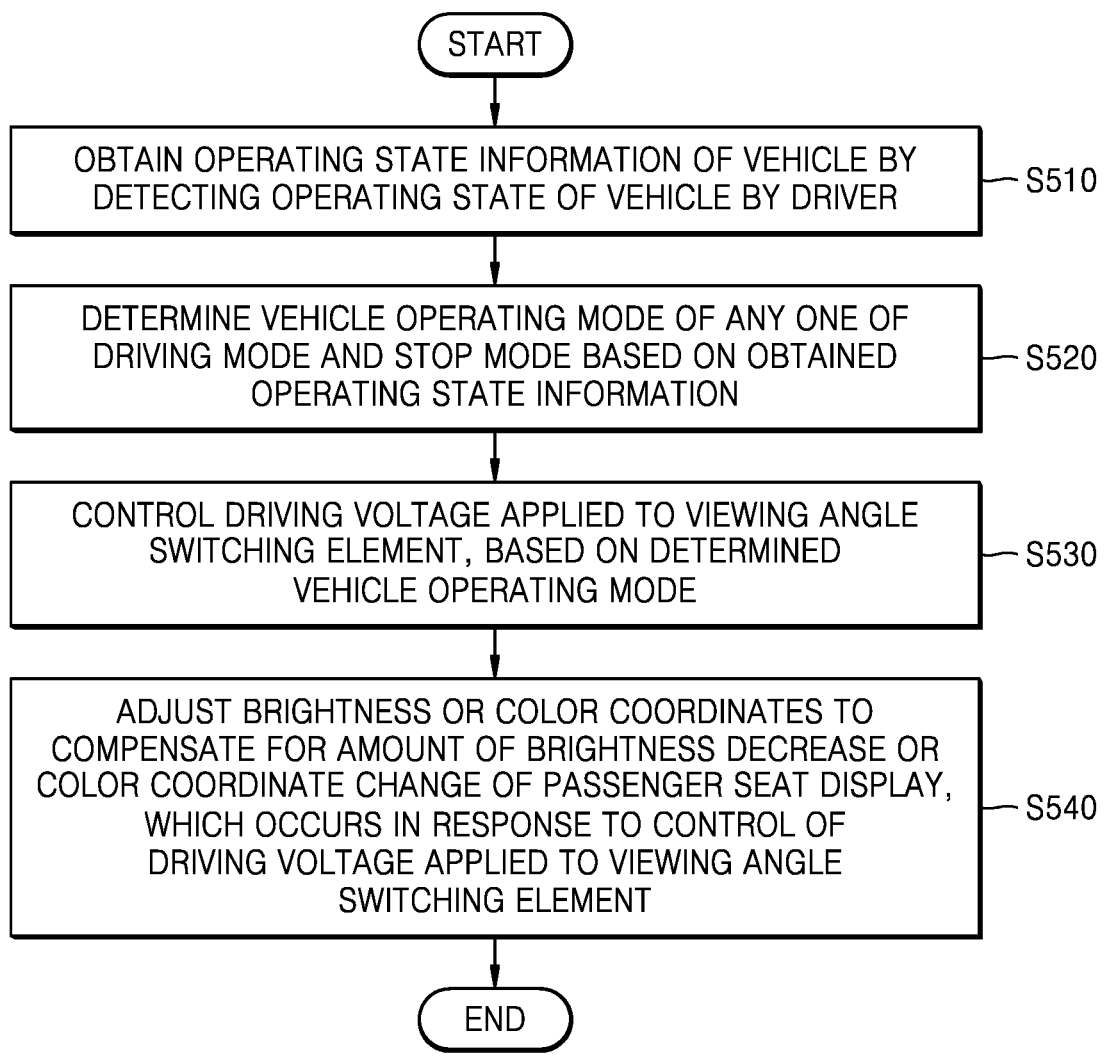
FIG. 5 is a flowchart of a method of controlling a passenger seat display, according to an embodiment of the disclosure.

FIG. 5 is a flowchart of a method, performed by the electronic apparatus 1000, of controlling a passenger seat display, according to an embodiment of the disclosure.

A determination is made of whether the vehicle is in motion. In certain embodiments, this can include operations S510 and S520. In operation S510, the electronic apparatus 1000 obtains operating state information of a vehicle by detecting a operating state of the vehicle being driven by a driver. According to an embodiment of the disclosure, the electronic apparatus 1000 may detect at least one of a velocity of the vehicle, pressure applied to an accelerator of the vehicle, or an operation of a steering wheel of the vehicle. According to an embodiment of the disclosure, the electronic apparatus 1000 may measure a real-time velocity of the vehicle and obtain data about the measured velocity. According to an embodiment of the disclosure, the electronic apparatus 1000 may obtain data about a change in a velocity of the vehicle over time. According to an embodiment of the disclosure, the electronic apparatus 1000 may detect a velocity of the vehicle when the velocity of the vehicle is a preset velocity or higher.

According to an embodiment of the disclosure, the electronic apparatus 1000 may detect pressure applied to the accelerator of the vehicle by the driver. According to an embodiment of the disclosure, the electronic apparatus 1000 may measure a pressure value applied to the accelerator and obtain the measured pressure value data.

According to an embodiment of the disclosure, the electronic apparatus 1000 may detect at least one of a rotating angle, a rotating velocity, a rotating direction, a number of times a rotating direction is switched, a steering angle, or a number of times a steering direction of the steering wheel is switched.

In operation S520, the electronic apparatus 1000 determines a vehicle operating mode of any one of the driving mode and the stop mode based on the obtained operating state information. According to an embodiment of the disclosure, the electronic apparatus 1000 may determine the operating mode of the vehicle as the driving mode when the detected velocity of the vehicle exceeds a preset threshold velocity, and determine the operating mode of the vehicle as the stop mode when the detected velocity of the vehicle is the preset threshold velocity or less. According to an embodiment of the disclosure, when pressure applied to the accelerator is detected, the electronic apparatus 1000 may determine the operating mode of the vehicle as the driving mode. According to an embodiment of the disclosure, when an operation of the steering wheel is detected, the electronic apparatus 1000 may determine the operating mode of the vehicle as the driving mode.

The electronic apparatus 1000 may obtain information about a operating state of the vehicle by detecting at least one of a velocity of the vehicle, pressure applied to the accelerator, or an operation of the steering wheel periodically according to a preset time interval and switch the operating mode of the vehicle to any one of the driving mode and the stop mode based on the obtained operating state information.

The method can include applying a driving voltage to a viewing angle switching element of the passenger seat display when the vehicle is determined to be in motion which in certain embodiments can include operation S530. In operation S530, the electronic apparatus 1000 controls a driving voltage applied to a viewing angle switching element, based on the determined operating mode of the vehicle. According to an embodiment of the disclosure, when the operating mode of the vehicle is determined as the driving mode, the electronic apparatus 1000 may apply the driving voltage to the viewing angle switching element, and when the operating mode of the vehicle is determined as the stop mode, the electronic apparatus 1000 may not apply the driving voltage to the viewing angle switching element. Herein, the driving voltage applied to the viewing angle switching element may be an AC voltage.

The method can include adjusting brightness or color coordinates of the passenger seat display to a target brightness value or a target color coordinate value, respectively, when the driving voltage is applied to the viewing angle switching element which in certain embodiments can include operation S540.

In operation S540, the electronic apparatus 1000 adjusts brightness or color coordinates to compensate for an amount of brightness decrease or color coordinate change of the passenger seat display, which occurs in response to the control of the driving voltage applied to the viewing angle switching element.

According to an embodiment of the disclosure, the electronic apparatus 1000 may adjust the brightness of the passenger seat display to the target brightness value, based on an amount of brightness decrease of the passenger seat display that occurs as a result of the application of the driving voltage to the viewing angle switching element. In certain embodiments, the target brightness value may be preset. According to an embodiment of the disclosure, the target brightness value may be set by a user input. The electronic apparatus 1000 may adjust the brightness of the passenger seat display by controlling a magnitude of a driving current applied to a light source of the passenger seat display.

According to an embodiment of the disclosure, the electronic apparatus 1000 may adjust the color coordinates of the passenger seat display to the target color coordinate value, wherein the target color coordinate value is based on an amount of change in the color coordinates that occurs as a result of the application of the driving voltage to the viewing angle switching element. According to an embodiment of the disclosure, the electronic apparatus 1000 may adjust a color coordinate value of the passenger seat display by adjusting an RGB output amount through a T-CON board or an image board configured to control an operation of an LCD panel of the passenger seat display.

Figure 6:
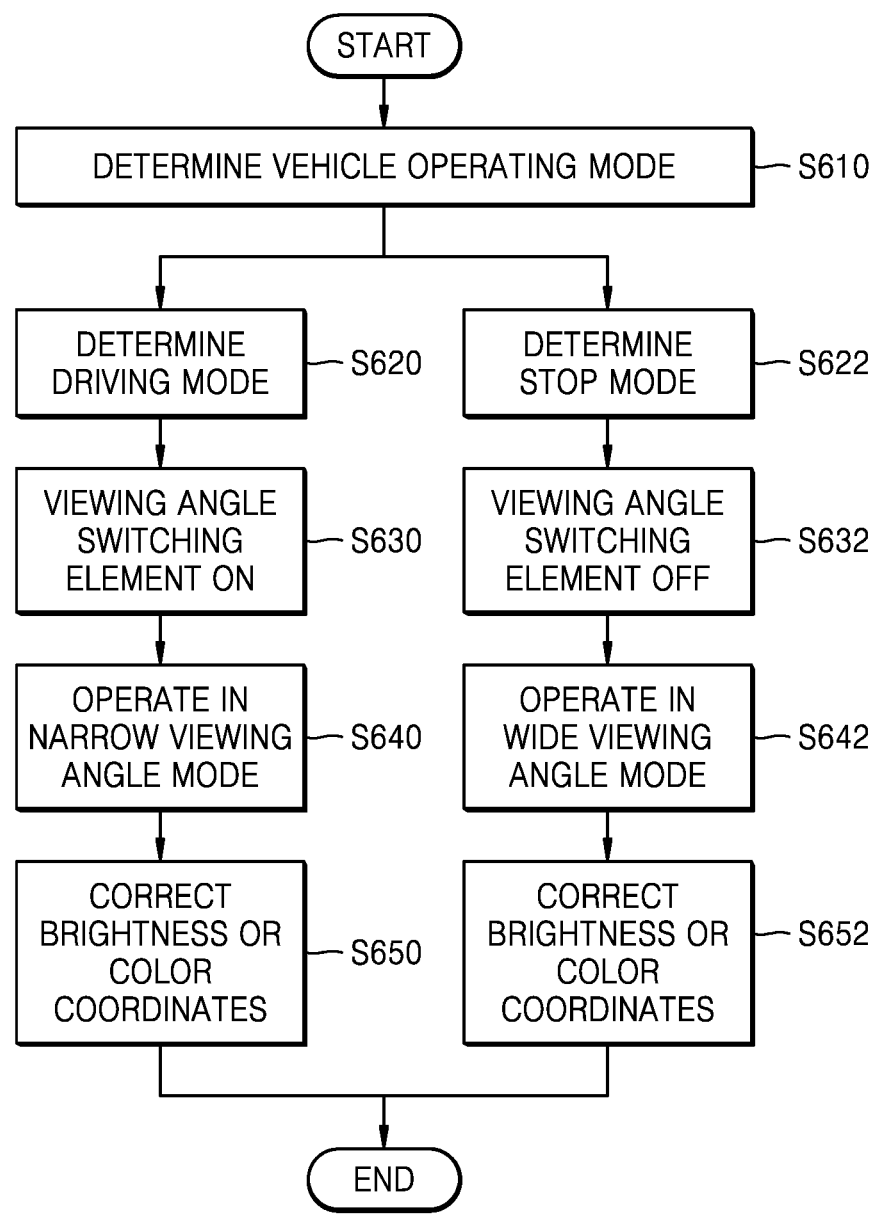
FIG. 6 is a flowchart of a method of controlling a passenger seat display according to a driving mode and a stop mode, according to an embodiment of the disclosure.

FIG. 6 is a flowchart of a method of controlling a passenger seat display according to the driving mode and the stop mode, according to an embodiment of the disclosure.

In operation S610, an electronic apparatus determines a operating mode of a vehicle. According to an embodiment of the disclosure, the electronic apparatus determines any one operating mode of the driving mode (S620) and the stop mode (S622) based on a operating state of the vehicle, which is detected by the sensor 1200 (see FIG. 4).

When the operating mode is determined as the driving mode (S620), the electronic apparatus switches a viewing angle switching element to an ON state by applying a driving voltage to the viewing angle switching element in operation S630.

When the viewing angle switching element is switched to the ON state, light emitted from a BLU and penetrated through the viewing angle switching element is concentrated to have a shape of collimated light, and accordingly, the passenger seat display operates in the narrow viewing angle mode in operation S640.

In operation S650, the electronic apparatus corrects brightness or color coordinates of the passenger seat display to compensate for decreased brightness or changed color coordinates based on a target brightness value or a target color coordinate value in the narrow viewing angle mode. According to an embodiment of the disclosure, the electronic apparatus may adjust a brightness value of the passenger seat display by using information about an amount of brightness decrease and decrease rate of the passenger seat display in the narrow viewing angle mode, which is pre-stored in the storage 1600 (see FIG. 4). According to an embodiment of the disclosure, the electronic apparatus may adjust color coordinates of the passenger seat display by using information about the change in the color coordinate value of the passenger seat display in the narrow viewing angle mode, which is pre-stored in the storage 1600 (see FIG. 4).

When the operating mode is determined as the stop mode (S622) in operation S610, the electronic apparatus does not apply the driving voltage to the viewing angle switching element, and accordingly, the viewing angle switching element is switched to an OFF state in operation S632.

When the viewing angle switching element is switched to the OFF state, light emitted from the BLU and penetrated through the viewing angle switching element is scattered to have a shape of diffused light, and accordingly, the passenger seat display operates in the wide viewing angle mode in operation S642.

In operation S652, the electronic apparatus corrects brightness or color coordinates of the passenger seat display to compensate for decreased brightness or changed color coordinates based on the target brightness value or the target color coordinate value in the wide viewing angle mode. According to an embodiment of the disclosure, the electronic apparatus may adjust a brightness value of the passenger seat display by using information about an amount of brightness decrease and decrease rate of the passenger seat display in the wide viewing angle mode, which is pre-stored in the storage 1600 (see FIG. 4). According to an embodiment of the disclosure, the electronic apparatus may adjust color coordinates of the passenger seat display by using information about the change in the color coordinate value of the passenger seat display in the wide viewing angle mode, which is pre-stored in the storage 1600 (see FIG. 4).

With respect to a passenger seat display among displays mounted inside a vehicle, not only a passenger sitting on a passenger seat but also a driver may view image content displayed on the passenger seat display when the vehicle stops (the stop mode), but the driver is not supposed to view image content displayed on the passenger seat display for safety when the vehicle is running (the driving mode). In addition, according to traffic regulations, except for special purpose content such as path guide navigation, a driver is inhibited from viewing content while driving. There is demand for a technique of performing a control such that a passenger sitting on a passenger seat may view content displayed on a passenger seat display both when a vehicle is running and when the vehicle stops.

Referring to FIGS. 3 to 6 of the disclosure, an electronic apparatus according to the disclosure may perform a control such that only a passenger sitting on a passenger seat may view image content displayed on a passenger seat display while driving and not only the passenger sitting on the passenger seat but also a driver may view image content displayed on the passenger seat display during stop, by adjusting a viewing angle of the passenger seat display to any one of the narrow viewing angle mode (S640) and the wide viewing angle mode (S642) by a method of detecting a operating state of a vehicle and controlling a driving voltage applied to the viewing angle switching element 1120 (see FIG. 3) including the PDLC layer 1122 (see FIG. 3) according to the detected operating state. Therefore, the electronic apparatus according to the disclosure may promote safe driving and compliance with traffic regulations and improve user convenience by enabling a passenger sitting on the passenger seat to enjoy image content displayed on the passenger seat display regardless of a operating state of the vehicle.

The electronic apparatus according to the disclosure may switch a viewing angle of the passenger seat display by applying or not applying a driving voltage to the viewing angle switching element, and according to the use of the viewing angle switching element, brightness or color coordinates of the passenger seat display may be changed. It is needed to perform a control such that the passenger sitting on the passenger seat is not aware of a brightness change or a color change while the vehicle is running or when the vehicle stops. A method, performed by the electronic apparatus according to the disclosure, of compensating for brightness or color coordinates of the passenger seat display in each of the driving mode and the stop mode will be described in detail with reference to FIGS. 7 to 9.

Figure 7:
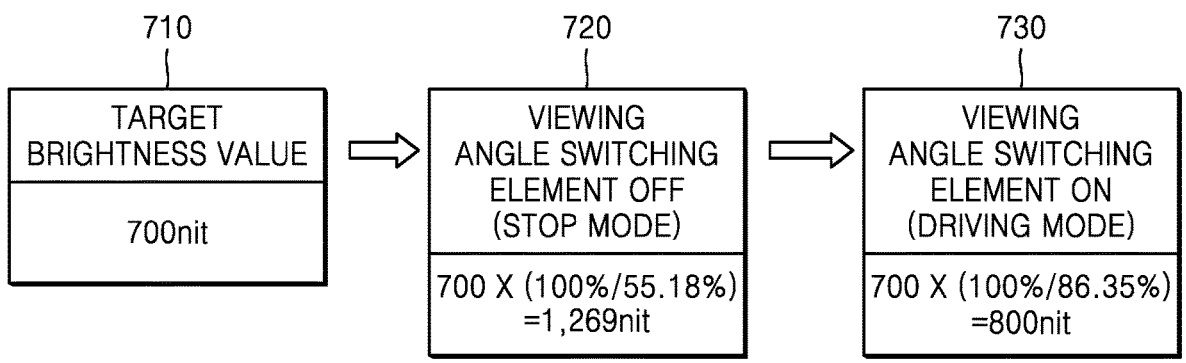
FIG. 7 illustrates adjusting brightness of a passenger seat display, according to an embodiment of the disclosure.

FIG. 7 illustrates adjusting brightness of a passenger seat display, according to an embodiment of the disclosure. The values shown in FIG. 7 are only illustrative for convenience of description, and the disclosure is not limited to the values shown in FIG. 7 and described below.

Referring to FIG. 7, brightness measurement value data 700 includes information about a brightness measurement value 702, a brightness change amount 704, and a brightness change rate 706 each of when no viewing angle switching element is present, when a driving voltage is applied to the viewing angle switching element (viewing angle switching element ON), and when the driving voltage is not applied to the viewing angle switching element (viewing angle switching element OFF). Referring to FIG. 6 together, the viewing angle switching element ON (S630) indicates that a operating mode of a vehicle is determined as the driving mode (S620), and in this case, the passenger seat display operates in the narrow viewing angle mode (S640). The viewing angle switching element OFF indicates that the operating mode of the vehicle is determined as the stop mode (S622), and in this case, the passenger seat display operates in the wide viewing angle mode (S642). The brightness change amount 704 and the brightness change rate 706 indicate a difference between a reference value, which is a brightness measurement value of the passenger seat display not including a viewing angle switching element, a brightness measurement value of the passenger seat display including the viewing angle switching element and a ratio of the difference to the reference value, respectively.

According to an embodiment of the disclosure, the brightness measurement value data 700 may be pre-stored in the storage 1600 (see FIG. 4) of an electronic apparatus.

Referring to the brightness measurement value data 700, for the passenger seat display not including the viewing angle switching element, the brightness measurement value 702 is 908 nit. For the passenger seat display including the viewing angle switching element, in a viewing angle switching element ON state, i.e., in the narrow viewing angle mode, the brightness measurement value 702 is 784 nit, the brightness change amount 704 is −124 nit, and the brightness change rate 706 is −13.65%. In a viewing angle switching element OFF state, i.e., in the wide viewing angle mode, the brightness measurement value 702 is 501 nit, the brightness change amount 704 is −407 nit, and the brightness change rate 706 is −44.82%. Referring to the brightness measurement value data 700, an amount of brightness decrease in the wide viewing angle mode (viewing angle switching element OFF) is greater than an amount of brightness decrease in the narrow viewing angle mode (viewing angle switching element ON).

A target brightness value 710 indicates a target brightness value of the passenger seat display including the viewing angle switching element. The target brightness value 710 may indicate the same target brightness value of the passenger seat display, which is supposed to be measured in both the viewing angle switching element ON state and the viewing angle switching element OFF state. The target brightness value 710 may be preset and pre-stored in the storage 1600 (see FIG. 4). According to an embodiment of the disclosure, the target brightness value 710 may be set by a user input. In the embodiment of the disclosure shown in FIG. 7, the target brightness value 710 is set as 700 nit.

The electronic apparatus may adjust brightness of the passenger seat display to 700 nit to compensate for an amount of brightness decrease of the passenger seat display in each of a viewing angle switching element OFF state 720 and a viewing angle switching element ON state 730. Referring to the embodiment of the disclosure shown in FIG. 7, in the viewing angle switching element OFF state 720, i.e., in the stop mode, the electronic apparatus may determine a brightness correction value of the passenger seat display as 1,269 nit by performing an arithmetic operation (100%/(100%−44.82%)) using brightness change rate− 44.82% on the target brightness value, 700 nit. The electronic apparatus may adjust the brightness of the passenger seat display by controlling a magnitude of a driving current applied to the light source 1112 (see FIG. 10) of the passenger seat display. According to an embodiment of the disclosure, when the electronic apparatus applies a driving current for implementing the brightness of 1,269 nit, which is a brightness correction value of the passenger seat display, to the light source 1112, brightness of light emitted from the light source 1112 decreases by penetrating through the viewing angle switching element, and accordingly, the brightness of the passenger seat display may be adjusted to 700 nit that is the target brightness value.

In the viewing angle switching element ON state 730, i.e., in the driving mode, the electronic apparatus may determine a brightness correction value of the passenger seat display as 810 nit by performing an arithmetic operation (100%/(100%−13.65%)) using brightness change rate−13.65% on the target brightness value, 700 nit. The electronic apparatus may adjust the brightness of the passenger seat display by controlling a magnitude of a driving current applied to the light source 1112 of the passenger seat display. According to an embodiment of the disclosure, when the electronic apparatus applies a driving current for implementing the brightness of 810 nit, which is a brightness correction value of the passenger seat display, to the light source 1112, brightness of light emitted from the light source 1112 decreases by penetrating through the viewing angle switching element, and accordingly, the brightness of the passenger seat display may be adjusted to 700 nit that is the target brightness value.

FIG. 8 illustrates adjusting color coordinates of a passenger seat display, according to an embodiment of the disclosure. The values shown in FIG. 8 are only illustrative for convenience of description, and the disclosure is not limited to the values shown in FIG. 8 and described below.

Referring to FIG. 8, color coordinate measurement value data 800 includes information about color coordinate measurement values and measurement value change amounts when no viewing angle switching element is present, when a driving voltage is applied to the viewing angle switching element (viewing angle switching element ON), and when the driving voltage is not applied to the viewing angle switching element (viewing angle switching element OFF), with respect to each of X color coordinate and Y color coordinate. The color coordinate measurement value data 800 may include a coordinate value in a CIE XY chromaticity distribution table defined in an xyz color space of the CIE.

X color coordinate and Y color coordinate measurement value change amounts 804 and 808 indicate difference values between reference values, which are an X color coordinate measurement value and a Y color coordinate measurement value of a passenger seat display not including a viewing angle switching element, and an X color coordinate measurement value and a Y color coordinate measurement value of a passenger seat display including the viewing angle switching element, respectively.

According to an embodiment of the disclosure, the color coordinate measurement value data 800 may be pre-stored in the storage 1600 (see FIG. 4) of an electronic apparatus.

Referring to the color coordinate measurement value data 800, for the passenger seat display not including the viewing angle switching element, an X color coordinate measurement value 802 is 0.3075, and a Y color coordinate measurement value 806 is 0.3333. For the passenger seat display including the viewing angle switching element, in the viewing angle switching element ON state, i.e., in the narrow viewing angle mode, the X color coordinate measurement value 802 is 0.3166, and the Y color coordinate measurement value 806 is 0.3428. In the viewing angle switching element ON state, the X color coordinate measurement value change amount 804 is +0.0091, and the Y color coordinate measurement value change amount 808 is +0.0095. In the viewing angle switching element OFF state, i.e., in the wide viewing angle mode, the X color coordinate measurement value 802 is 0.3225, and the Y color coordinate measurement value 806 is 0.3515. In the viewing angle switching element OFF state, the X color coordinate measurement value change amount 804 is +0.0150, and the Y color coordinate measurement value change amount 808 is +0.0182. Referring to the color coordinate measurement value data 800, X color coordinate and Y color coordinate measurement value change amounts in the wide viewing angle mode (viewing angle switching element OFF) are greater than X color coordinate and Y color coordinate measurement value change amounts in the narrow viewing angle mode (viewing angle switching element ON).

A target color coordinate value 810 indicates a target color coordinate value of the passenger seat display including the viewing angle switching element. The target color coordinate value 810 may indicate the same target color coordinate value of the passenger seat display, which is supposed to be measured in both the viewing angle switching element ON state and the viewing angle switching element OFF state. The target color coordinate value 810 may be preset and pre-stored in the storage 1600 (see FIG. 4). According to an embodiment of the disclosure, the target color coordinate value 810 may be set by a user input. In the embodiment of the disclosure shown in FIG. 8, the target color coordinate value 810 is set as 0.3302 for X color coordinate and 0.3401 for Y color coordinate.

The electronic apparatus may adjust color coordinates of the passenger seat display to the target color coordinate value 810 (0.3302, 0.3401) to compensate for a color coordinate change amount of the passenger seat display in each of viewing angle switching element ON and viewing angle switching element OFF. Referring to the embodiment of the disclosure shown in FIG. 8, in a viewing angle switching element ON state 820, i.e., in the driving mode, the electronic apparatus may calculate correction values 824 by using value information of the X color coordinate and Y color coordinate measurement value change amounts 804 and 808 of the color coordinate measurement value data 800. The correction values 824 may be calculated by inverting signs of the X color coordinate measurement value change amount 804 and the Y color coordinate measurement value change amount 808 in the viewing angle switching element ON state 820. For example, the correction value 824 of X color coordinate may be calculated as −0.0091 by inverting the sign of +0.0091 that is the X color coordinate measurement value change amount 804, and the correction value 824 of Y color coordinate may be calculated as −0.0095 by inverting the sign of +0.0095 that is the Y color coordinate measurement value change amount 808. Adjustment values 826 may be obtained by shifting color coordinates by the correction values 824 with respect to the target color coordinate value 810. According to an embodiment of the disclosure, the adjustment values 826 may be calculated through an arithmetic operation of the target color coordinate value 810 and the correction values 824 For example, the adjustment value 826 of X color coordinate may be calculated as 0.3211 by calculating 0.3302−0.0091, and the adjustment value 826 of Y color coordinate may be calculated as 0.3251 by calculating 0.3401−0.0095.

When switching from the viewing angle switching element ON state 820 to a viewing angle switching element OFF state 830, i.e., in the stop mode, the electronic apparatus may calculate correction values 834 by using value information of the X color coordinate and Y color coordinate measurement value change amounts 804 and 808 of the color coordinate measurement value data 800. The correction values 834 may be obtained by calculating differences between color coordinate measurement value change amounts in the viewing angle switching element ON state 820 and color coordinate measurement value change amounts in the viewing angle switching element OFF state 830. Referring to the color coordinate measurement value data 800, the X color coordinate measurement value change amount 804 in the viewing angle switching element ON state 820 is +0.0091, and the X color coordinate measurement value change amount 804 in the viewing angle switching element OFF state 830 is +0.0150. The correction value 834 of X color coordinate may be calculated as −0.0059 that is a difference between +0.0091, which is the X color coordinate measurement value change amount 804 in the viewing angle switching element ON state 820, and +0.0150, which is the X color coordinate measurement value change amount 804 in the viewing angle switching element OFF state 830. Likewise, the Y color coordinate measurement value change amount 808 in the viewing angle switching element ON state 820 is +0.0095, and the Y color coordinate measurement value change amount 808 in the viewing angle switching element OFF state 830 is +0.0182. The correction value 834 of Y color coordinate may be calculated as −0.0087 that is a difference between +0.0095, which is the Y color coordinate measurement value change amount 808 in the viewing angle switching element ON state 820, and +0.0182, which is the Y color coordinate measurement value change amount 808 in the viewing angle switching element OFF state 830.

Adjustment values 836 may be obtained by shifting color coordinates by the correction values 834 with respect to the target color coordinate value 810. According to an embodiment of the disclosure, the adjustment values 836 may be calculated through an arithmetic operation of the target color coordinate value 810 and the correction values 834 For example, the adjustment value 836 of X color coordinate may be calculated as 0.3243 by calculating 0.3302−0.0059, and the adjustment value 836 of Y color coordinate may be calculated as 0.3314 by calculating 0.3401−0.0087.

Figure 9:
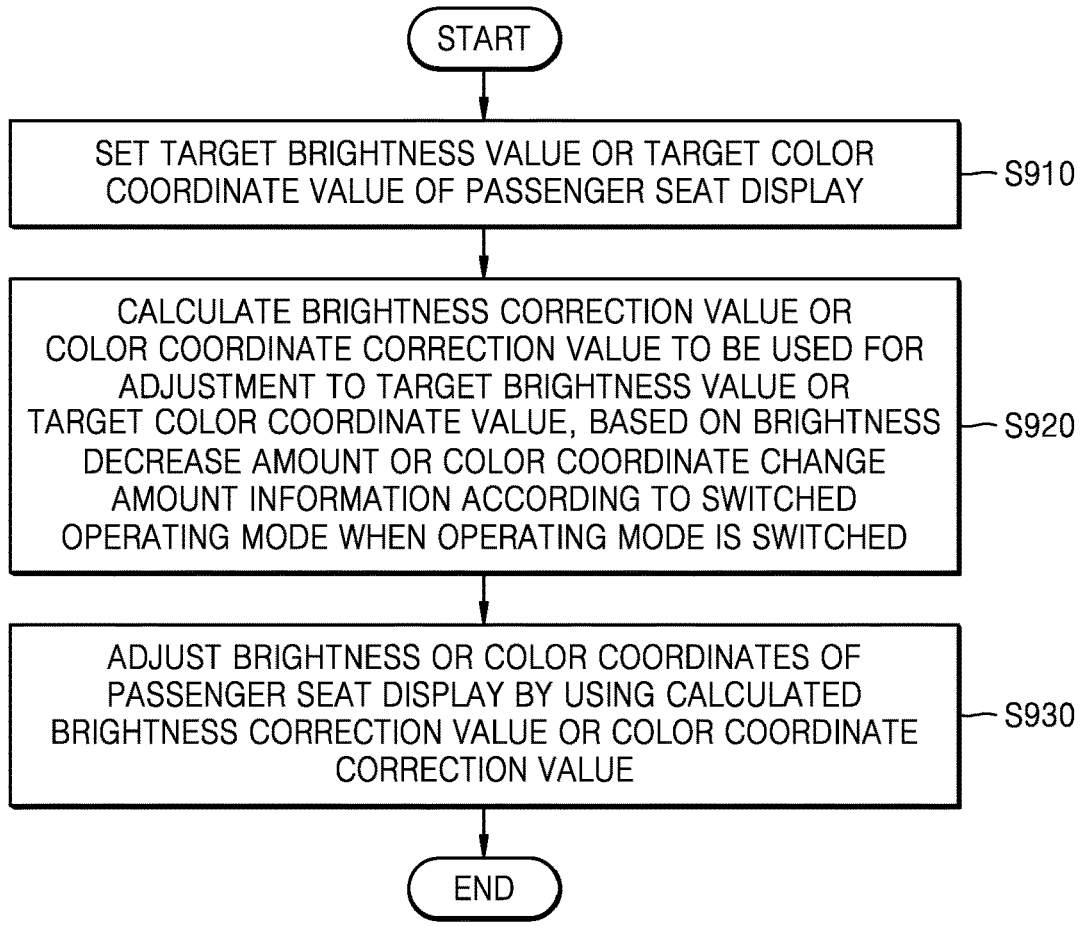
FIG. 9 is a flowchart of a method of adjusting brightness or color coordinates of a passenger seat display, according to an embodiment of the disclosure.

FIG. 9 is a flowchart of a method of adjusting brightness or color coordinates of a passenger seat display, according to an embodiment of the disclosure.

In operation S910, an electronic apparatus sets a target brightness value or a target color coordinate value of the passenger seat display. The target brightness value indicates a target brightness value of the passenger seat display including a viewing angle switching element, and the target color coordinate value indicates a target brightness value of the passenger seat display including the viewing angle switching element The target brightness value or the target color coordinate value may be set by a user input. The target brightness value or the target color coordinate value may be stored in the storage 1600 (see FIG. 4) of the electronic apparatus.

In operation S920, the electronic apparatus calculates a brightness correction value or a color coordinate correction value to be used for adjustment to the target brightness value or the target color coordinate value, based on the amount of brightness decrease or color coordinate change amount information according to a switched operating mode when the operating mode is switched. According to an embodiment of the disclosure, the electronic apparatus may obtain, from brightness measurement value data pre-stored in the storage 1600, information about an amount of brightness decrease and decrease rate of the passenger seat display each of when a driving voltage is applied to the viewing angle switching element and when the driving voltage is not applied to the viewing angle switching element, and calculate the brightness correction value by using the obtained information about the amount of brightness decrease and decrease rate. For example, in the driving mode, the electronic apparatus may calculate a brightness correction value to adjust brightness of the passenger seat display to the target brightness value, by using an amount of brightness decrease value and a brightness decrease rate value in a viewing angle switching element OFF state because the driving voltage is not applied to the viewing angle switching element. In addition, in the stop mode, the electronic apparatus may calculate a brightness correction value to adjust brightness of the passenger seat display to the target brightness value, by using an amount of brightness decrease value and a brightness decrease rate value in a viewing angle switching element ON state because the driving voltage is applied to the viewing angle switching element. A particular method of calculating a brightness correction value has been described with reference to FIG. 7, and thus, the description made with reference to FIG. 7 is not repeated herein.

According to an embodiment of the disclosure, the electronic apparatus may obtain, from color coordinate measurement value data pre-stored in the storage 1600, information about a color coordinate change amount of the passenger seat display each of when the driving voltage is applied to the viewing angle switching element and when the driving voltage is not applied to the viewing angle switching element, and calculate the color coordinate correction value by using the obtained information about the color coordinate change amount. For example, in the driving mode, a color coordinate correction value to adjust color coordinates of the passenger seat display to the target color coordinate value may be calculated by using a color coordinate change amount value in a viewing angle switching element OFF state because the driving voltage is not applied to the viewing angle switching element. In addition, in the stop mode, a color coordinate correction value to adjust color coordinates of the passenger seat display to the target color coordinate value may be calculated by using a color coordinate change amount value in a viewing angle switching element ON state because the driving voltage is applied to the viewing angle switching element. A particular method of calculating a color coordinate correction value has been described with reference to FIG. 8, and thus, the description made with reference to FIG. 8 is not repeated herein.

In operation S930, the electronic apparatus adjusts the brightness or the color coordinates of the passenger seat display by using the calculated brightness correction value or color coordinate correction value. According to an embodiment of the disclosure, the electronic apparatus may adjust the brightness of the passenger seat display by controlling a magnitude of a driving current applied to the light source 1112 (see FIG. 10) of the passenger seat display. According to an embodiment of the disclosure, the electronic apparatus may adjust the brightness of the passenger seat display by determining a magnitude of the driving current based on the calculated brightness correction value and applying the determined magnitude of the driving current to the light source 1112.

According to an embodiment of the disclosure, the electronic apparatus may adjust color coordinates of the passenger seat display by adjusting an RGB output amount through a T-CON board or an image board configured to control an operation of an LCD panel 1130 (see FIG. 10) of the passenger seat display. According to an embodiment of the disclosure, the electronic apparatus may adjust the color coordinates of the passenger seat display based on the calculated color coordinate correction value. According to an embodiment of the disclosure, the electronic apparatus may adjust the color coordinates of the passenger seat display by using a software tuning method.

A program executed by the electronic apparatus 1000 described in the specification may be implemented by hardware components, software components, and/or a combination of hardware components and software components. The program may be performed by all systems capable of performing computer-readable instructions.

Software may include a computer program, code, instructions, or a combination thereof, and constitute a processing device so as to operate as desired, or independently or collectively command the processing device.

The software may be implemented by a computer program including instructions stored in a computer-readable storage medium. Examples of the computer-readable storage medium may include magnetic storage media (e.g., ROM, RAM, floppy disks, hard disks, etc.) and optical recording media (e.g., CD-ROMs, digital versatile discs (DVDs), etc.). The computer-readable storage medium may be distributed over network coupled computer systems so that the computer-readable code is stored and executed in a distributed fashion. The media may be read by a computer, stored in a memory, and executed by a processor.

The computer-readable storage medium may be provided in a form of non-transitory storage medium. Herein, the term 'non-transitory' merely indicates that a storage medium is tangible without including a signal, and does not discriminate whether data is semipermanently or temporarily stored in a storage medium.

In addition, the program according to the embodiments of the disclosure may be provided by being included in a computer program product. The computer program product may be traded between a seller and a purchaser.

The computer program product may include a software program or a non-transitory computer-readable storage medium in which the software program is stored. For example, the computer program product may include a software program form of product (e.g., a downloadable application) electronically distributed through a manufacturing company of the electronic device or an electronic market (e.g., Google PlayStore™, or App Store™). For the electronic distribution, at least a portion of the software program may be stored in a storage medium or temporarily generated. In this case, the storage medium may be included in a server of the manufacturing company, a server of the electronic market, or a relay server configured to temporarily store the software program.

The computer program product may include a storage medium of a server or a storage medium of a device in a system including the server and the device. Alternatively, when a third device (e.g., a smartphone) connected to the server or the electronic apparatus 1000 through communication exists, the computer program product may include a storage medium of the third device. Alternatively, the computer program product may include the software program to be transmitted from the server to the electronic apparatus 1000 or the third device or transmitted from the third device to the device.

In this case, one of the server, the electronic apparatus 1000, and the third device may execute the computer program product and perform the methods according to the embodiments of the disclosure. Alternatively, two or more of the server, the electronic apparatus 1000, and the third device may execute the computer program product and perform the methods according to the embodiments of the disclosure in a distributed fashion.

For example, the electronic apparatus 1000 may execute the computer program product stored the server to control the electronic apparatus 1000 connected to the server through communication such that the electronic apparatus 1000 performs the methods according to the embodiments of the disclosure.

As another example, the third device may execute the computer program product to control a device connected to the third device through communication such that the device performs the methods according to the embodiments of the disclosure.

When the third device executes the computer program product, the third device may download the computer program product from the server and execute the downloaded computer program product. Alternatively, the third device may execute the computer program product provided in a pre-loaded state such that the methods according to the embodiments of the disclosure are performed.

FIG. 10 is a cross-sectional view of the passenger seat display 1100 according to an embodiment of the disclosure.

Referring to FIG. 10, the passenger seat display 1100 may include the BLU 1110, the viewing angle switching element 1120, and the LCD panel 1130. The viewing angle switching element 1120 may be on an upper surface of the BLU 1110, and the viewing angle switching element 1120 may be separated by a certain distance from the BLU 1110. The LCD panel 1130 may be on an upper surface of the viewing angle switching element 1120.

Although not shown, according to an embodiment of the disclosure, an optical film may be formed between the BLU 1110 and the viewing angle switching element 1120. The optical film may be laminated by an optically transparent adhesive or formed in a stacking structure of a film stacked in a state in which an air gap is present between the BLU 1110 and the viewing angle switching element 1120.

The BLU 1110 may include the light source 1112, the LGP 1114, the reflective member 1116, and a prism plate 1118. The light source 1112 may output light to an edge of the LGP 1114. According to an embodiment of the disclosure, the light source 1112 may include a light emitting diode (LED). According to certain embodiments, the brightness of the passenger seat display 150 can be changed by changing a magnitude of a driving current applied to the light source 1112.

The LGP 1114 may deliver the light to the LCD panel 1130 by changing a path of the light incident from the light source 1112. The LGP 1114 may change directivity of light scattered without having a certain angle to a direction of a second surface 1114-2 facing the prism plate 1118. A fine pattern may be formed on the second surface 1114-2 of the LGP 1114 to enhance directivity of light and improve light concentration. This will be described in detail with reference to FIGS. 13 and 14.

The reflective member 1116 is a component increasing light efficiency by providing recirculation of light reflected through the LGP 1114. The reflective member 1116 may be adjacent to a first surface 1114-1 of the LGP 1114. The reflective member 1116 may be arranged in contact with the first surface 1114-1 of the LGP 1114 but is not limited thereto. According to an embodiment of the disclosure, the reflective member 1116 may be separated by a certain distance from the LGP 1114. This will be described in detail with reference to FIGS. 11 and 12. According to an embodiment of the disclosure, the reflective member 1116 may include silver.

The prism plate 1118 may be adjacent to the second surface 1114-2 of the LGP 1114. The prism plate 1118 may include a plurality of prism patterns 1118p protruding in an inverted triangle shape in a direction facing the second surface 1114-2 of the LGP 1114. The plurality of prism patterns 1118p are finely structured patterns formed on the surface of the prism plate 1118 and may protrude in the direction facing the LGP 1114. The plurality of prism patterns 1118p may switch a direction of light to a vertical direction with respect to a horizontal direction of the prism plate 1118 by using diffractiveness or refractiveness of light output from the LGP 1114. The prism plate 1118 may include the plurality of prism patterns 1118p to improve the concentration of light output from the LGP 1114.

The plurality of prism patterns 1118p may be formed by using a tool to perform structurization through a cast-and-cure or extruding duplication technique. The tool is produced by using an engraving, embossing, laser ablation or lithography. However, the method described above is only an example of forming the plurality of prism patterns 1118p, and the present embodiment of the disclosure is not limited thereto.

The prism plate 1118 may include acryl resin, e.g., polymethyl methacrylate (PMMA), polystyrene, polycarbonate, polyester, and silicon but is not limited thereto.

The viewing angle switching element 1120 may be between the BLU 1110 and the LCD panel 1130. According to an embodiment of the disclosure, the viewing angle switching element 1120 may include a PDLC. The viewing angle switching element 1120 has been described with reference to FIGS. 3 and 4, and thus, the description made with reference to FIGS. 3 and 4 is not repeated herein.

The LCD panel 1130 may include a TFT-LCD panel including liquid crystal molecules and a color filter.

Figure 11:
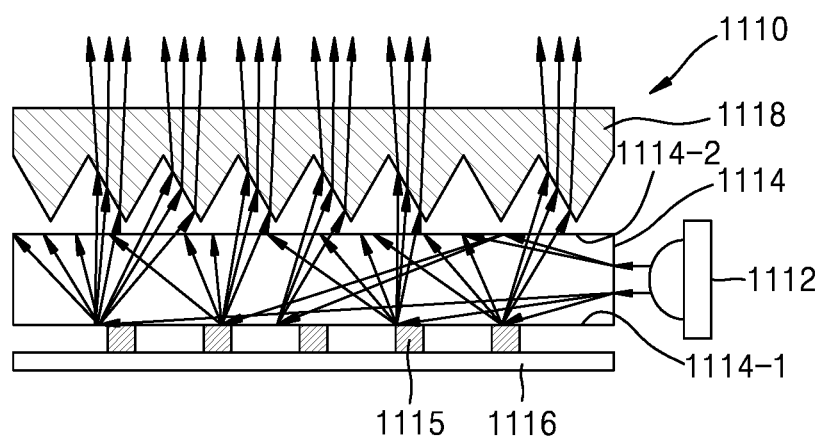
FIG. 11 is a cross-sectional view of a backlight unit (BLU) of a passenger seat display, according to an embodiment of the disclosure.

FIG. 11 is a cross-sectional view of the BLU 1110 of a passenger seat display, according to an embodiment of the disclosure.

Referring to FIG. 11, the BLU 1110 may include the light source 1112, the LGP 1114, the reflective member 1116, and the prism plate 1118. The light source 1112, the LGP 1114, and the prism plate 1118 are the same as those shown in FIG. 10, and thus, the description made with reference to FIG. 10 is not repeated herein.

The reflective member 1116 may be adjacent to the first surface 1114-1 of the LGP 1114 and separated by a preset distance from the LGP 1114. An air gap may be formed between the reflective member 1116 and the LGP 1114.

A plurality of connection members 1115 may be between the reflective member 1116 and the first surface 1114-1 of the LGP 1114. The plurality of connection members 1115 may be formed in a cylindrical shape but is not limited thereto. According to an embodiment of the disclosure, the plurality of connection members 1115 may be formed in a cylindrical structure having a circular cross-section of which a diameter is greater than or equal to 20 μm and less than 50 μm and having a height within a range greater than or equal to 2 μm and less than 5 μm. A cross-sectional shape of the plurality of connection members 1115 will be described in detail with reference to FIG. 12.

Figure 12:
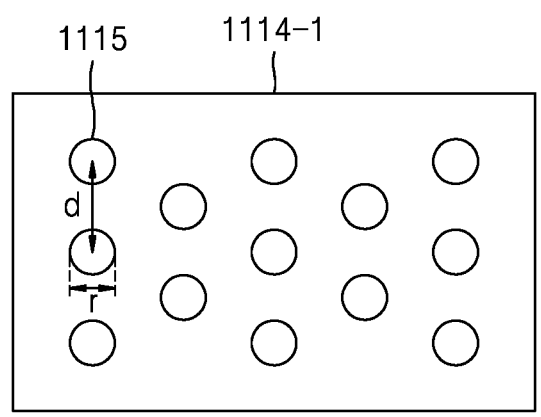
FIG. 12 is a bottom view of a light guide plate (LGP) of a passenger seat display, according to an embodiment of the disclosure.

FIG. 12 is a bottom view of the LGP 1114 of a passenger seat display, according to an embodiment of the disclosure. In FIG. 12, the reflective member 1116 (see FIG. 11) is not shown for convenience of description.

Referring to FIG. 12, the plurality of connection members 1115 may be on the first surface 1114-1 of the LGP 1114. The plurality of connection members 1115 may connect the LGP 1114 to the reflective member 1116. The plurality of connection members 1115 may be formed in a cylindrical shape having the same height as a separated distance between the first surface 1114-1 of the LGP 1114 and the reflective member 1116.

The plurality of connection members 1115 may be separated from each other by a preset distance. In the embodiment of the disclosure shown in FIG. 12, the plurality of connection members 1115 may be separated from each other by a distance d. For example, the distance d by which the plurality of connection members 1115 are separated from each other may be greater than or equal to 60 μm and less than 110 μm but is not limited thereto.

A cross-section of each of the plurality of connection members 1115 may be circular. A diameter r of each of the plurality of connection members 1115 may be greater than or equal to 20 μm and less than 50 μm. However, this is only illustrative, and the diameter r of each of the plurality of connection members 1115 is not limited thereto.

Although FIG. 12 shows that the cross-section of each of the plurality of connection members 1115 is circular, the present embodiment of the disclosure is not limited thereto. According to an embodiment of the disclosure, the plurality of connection members 1115 may have a pillar shape of which the cross-section is quadrangular or polygonal.

Figure 13:
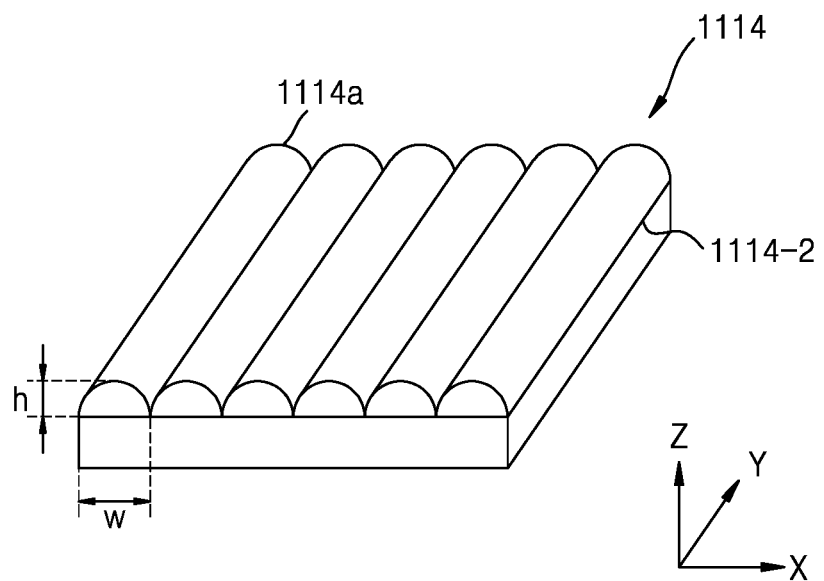
FIG. 13 is a perspective view of an LGP of a passenger seat display, according to an embodiment of the disclosure.

FIG. 13 is a perspective view of the LGP 1114 of a passenger seat display, according to an embodiment of the disclosure.

Referring to FIG. 13, a plurality of lenticular patterns 1114a may be formed on the second surface 1114-2 of the LGP 1114. The plurality of lenticular patterns 1114a may be formed in a shape having a certain width in a first direction (X-axis direction), extending in a second direction (Y-axis direction), and protruding by a certain height in a height direction (Z-axis direction). The plurality of lenticular patterns 1114a may be formed to protrude in a direction facing the prism plate 1118 (see FIG. 10).

According to an embodiment of the disclosure, a height h of the plurality of lenticular patterns 1114a may be greater than or equal to 5 μm and less than 10 μm, and a width w thereof may be greater than or equal to 17 μm and less than 30 μm, but the present embodiment of the disclosure is not limited thereto.

The plurality of lenticular patterns 1114a may be included to improve the light concentration performance of the LGP 1114.

Figure 14:
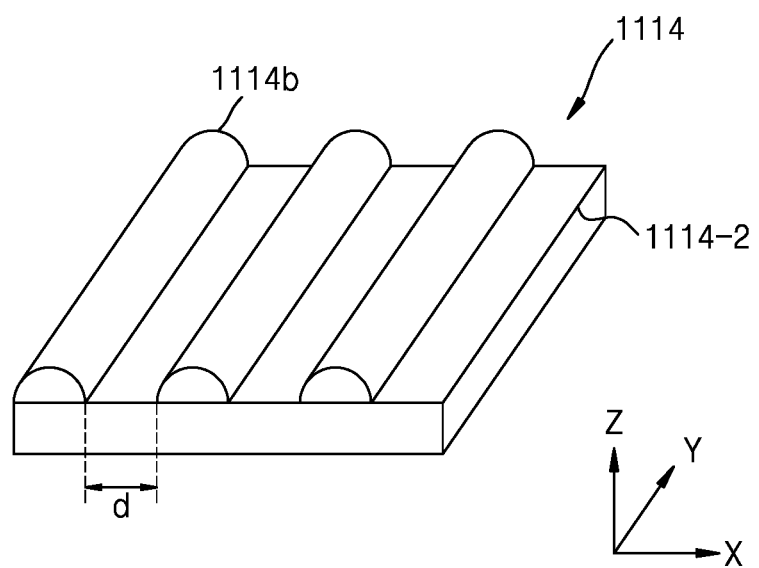
FIG. 14 is a perspective view of an LGP of a passenger seat display, according to an embodiment of the disclosure.

FIG. 14 is a perspective view of the LGP 1114 of a passenger seat display, according to an embodiment of the disclosure.

Referring to FIG. 14, a plurality of lenticular patterns 1114b may be formed on the second surface 1114-2 of the LGP 1114. The plurality of lenticular patterns 1114b may be formed in a shape having a certain width in the first direction (X-axis direction), extending in the second direction (Y-axis direction), and protruding by a certain height in the height direction (Z-axis direction). The plurality of lenticular patterns 1114b may be formed to protrude in a direction facing the prism plate 1118 (see FIG. 10).

The plurality of lenticular patterns 1114b may be separated from each other by a preset distance d. According to an embodiment of the disclosure, the plurality of lenticular patterns 1114b may be formed to have the distance d greater than or equal to 12 μm and less than 25 μm therebetween. However, this is only illustrative, and the distance d by which the plurality of lenticular patterns 1114b are separated from each other is not limited thereto.

The plurality of lenticular patterns 1114b may be included to improve the light concentration performance of the LGP 1114.

Figure 15:
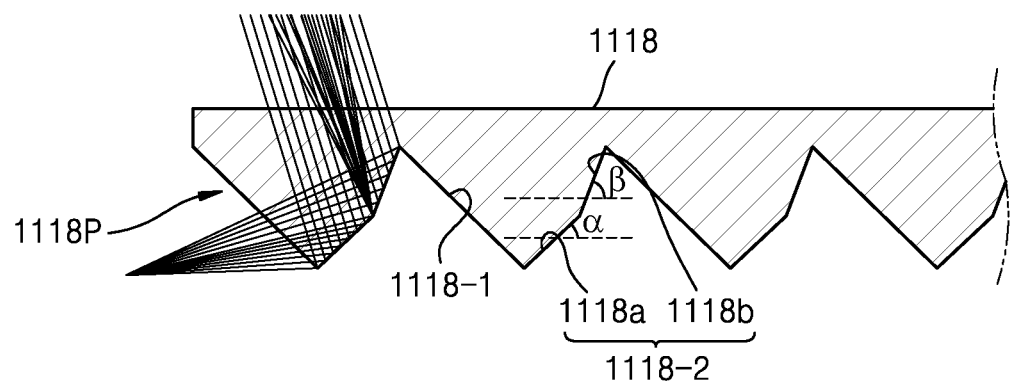
FIG. 15 is a cross-sectional view of a prism plate of a passenger seat display, according to an embodiment of the disclosure.

FIG. 15 is a cross-sectional view of the prism plate 1118 of a passenger seat display, according to an embodiment of the disclosure.

Referring to FIG. 15, the prism plate 1118 may include the plurality of prism patterns 1118p protruding in an inverted triangle shape in a direction facing the LGP 1114 (see FIG. 10). The plurality of prism patterns 1118p are finely structured patterns formed on the surface of the prism plate 1118 and may protrude in the direction facing the LGP 1114 (see FIG. 10).

The plurality of prism patterns 1118p may be formed in an inverted triangle shape and include a first surface 1118-1 and a second surface 1118-2. According to an embodiment of the disclosure, the second surface 1118-2 may be formed in a multi-surface structure having different angles. The second surface 1118-2 may include a (2-1)st face 1118a formed to have α° with respect to a horizontal plane and a (2-2)nd face 1118b formed to have β° with respect to the horizontal plane.

According to an embodiment of the disclosure, α° may be greater than β°. The prism plate 1118 shown in FIG. 15 may improve light concentration more than the prism plate 1118 shown in FIG. 10 by using the (2-1)st face 1118a formed at the angle of α° with respect to the horizontal plane to diffract or refract light output from the LGP 1114 (see FIG. 10) and using the (2-2)nd face 1118b formed at the angle of β° with respect to the horizontal plane to re-refract the refracted light at an angle greater than α°. Brightness at the front of the passenger seat display including the prism plate 1118 shown in FIG. 15 may be greater than brightness at the front of the passenger seat display 1110 including the prism plate 1118 (see FIG. 10) shown in FIG. 10.

Figure 16:
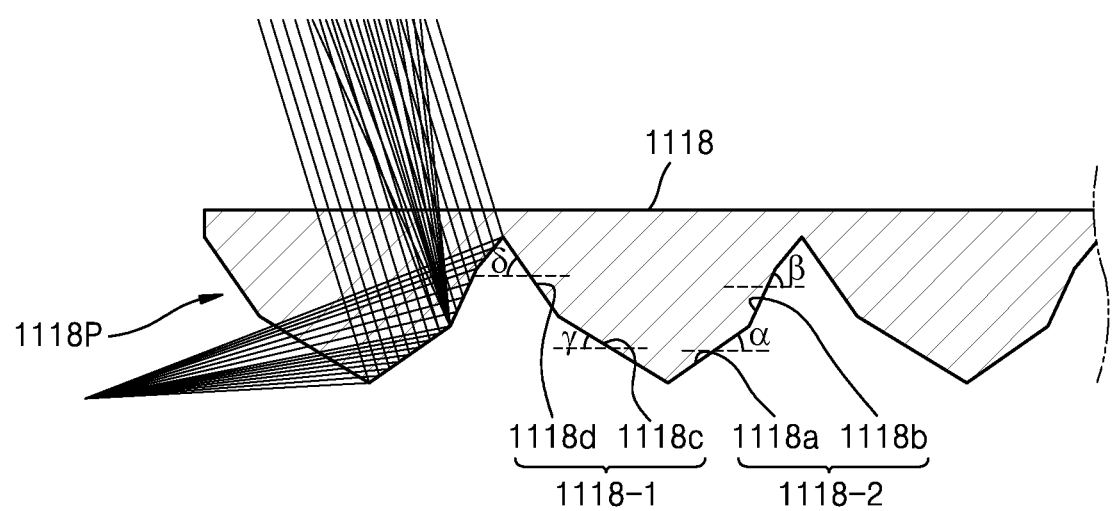
FIG. 16 is a cross-sectional view of a prism plate of a passenger seat display, according to an embodiment of the disclosure.

FIG. 16 is a cross-sectional view of the prism plate 1118 of a passenger seat display, according to an embodiment of the disclosure.

The prism plate 1118 may include the plurality of prism patterns 1118p protruding in an inverted triangle shape in a direction facing the LGP 1114 (see FIG. 10). The plurality of prism patterns 1118p are finely structured patterns formed on the surface of the prism plate 1118 and may protrude in the direction facing the LGP 1114 (see FIG. 10).

The plurality of prism patterns 1118p may be formed in an inverted triangle shape and include the first surface 1118-1 and the second surface 1118-2. Unlike the embodiment of the disclosure shown in FIG. 15, in the embodiment of the disclosure shown in FIG. 16, not only the second surface 1118-2 but also the first surface 1118-1 may be formed in a multi-surface structure having different angles. The first surface 1118-1 may include a (1-1)st face 1118c formed to have γ° with respect to the horizontal plane and a (1-2)nd face 1118d formed to have δ° with respect to the horizontal plane. The second surface 1118-2 may include the (2-1)st face 1118a formed to have α° with respect to the horizontal plane and the (2-2)nd face 1118b formed to have β° with respect to the horizontal plane.

According to an embodiment of the disclosure, α° may be greater than β°, and γ° may be greater than δ°. However, the present embodiment of the disclosure is not limited thereto.

According to an embodiment of the disclosure, α° may be the same as β°, and γ° may be the same as δ°. However, the present embodiment of the disclosure is not limited thereto.

The prism plate 1118 shown in FIG. 16 may use the (2-1)st face 1118a formed at the angle of α° with respect to the horizontal plane to diffract or refract light output from the LGP 1114 (see FIG. 10) and use the (2-2)nd face 1118b formed at the angle of β° with respect to the horizontal plane to re-refract the refracted light at an angle greater than α°. In addition, the prism plate 1118 may use the (1-1)st face 1118c formed at the angle of γ° with respect to the horizontal plane to diffract or refract light output from the LGP 1114 (see FIG. 10) and use the (1-2)nd face 1118d formed at the angle of δ° with respect to the horizontal plane to re-refract the refracted light at an angle greater than γ°. Therefore, brightness at the front of the passenger seat display including the prism plate 1118 shown in FIG. 16 may be greater than brightness at the front of the passenger seat display including the prism plate 1118 (see FIG. 15) shown in FIG. 15.

Figure 17:
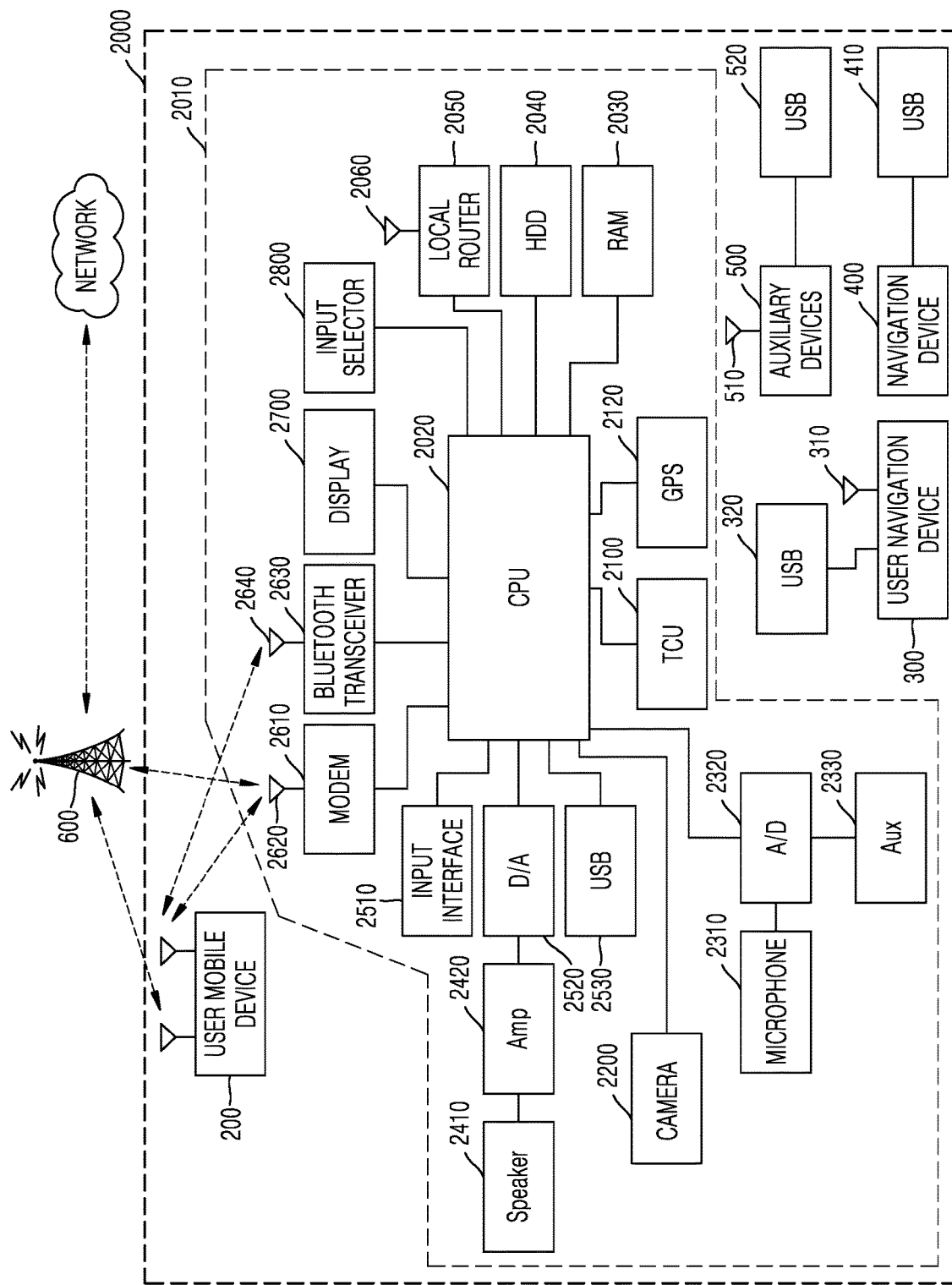
FIG. 17 is a block diagram of a vehicle-based computing system according to an embodiment of the disclosure.

FIG. 17 is a block diagram of a vehicle-based computing system 2000 according to an embodiment of the disclosure.

The vehicle-based computing system 2000 indicates a set of electronic devices for controlling traveling of a vehicle, transmitting and receiving data related to the vehicle, and controlling an operation of an auxiliary device of the vehicle (e.g., opening/closing a window or a door). An electronic apparatus 2010 included in the vehicle-based computing system 2000 may be a vehicle-mounted device, a device connected to a vehicle-mounted device in a wired or wireless manner, or a device around the vehicle. The vehicle-based computing system 2000 shown in FIG. 17 may include the electronic apparatus 1000 shown in FIG. 4. According to an embodiment of the disclosure, the electronic apparatus 2010 may be the same as the electronic apparatus 1000 shown in FIG. 4.

In certain embodiments, the vehicle-based computing system 2000 may be implemented by less or more components than the components shown in FIG. 17.

Referring to FIG. 17, the vehicle-based computing system 2000 according to an embodiment of the disclosure may include a telematics control unit (TCU) 2100. The TCU 2100 may be configured to support wireless mobile communication for the vehicle. The TCU 2100 may include at least some components of the electronic apparatus 1000 shown in FIG. 4.

At least some of operations and functions performed by the processor 1400 (see FIG. 4) of FIG. 4 may be performed by a CPU 2020 of FIG. 17. However, the embodiment of the disclosure is not limited thereto, and the TCU 2100 may include a separate processor configured to control an operation of the TCU 2100. In addition, each component included in the electronic apparatus 1000 (see FIG. 4) of FIG. 4 may be included inside the TCU 2100 or connected to the TCU 2100 at the outside of the TCU 2100. For example, the memory 1500 (see FIG. 4) of FIG. 4 may correspond to RAM 2030 of FIG. 17, and the storage 1600 (see FIG. 4) of FIG. 4 may correspond to a hard disk drive (HDD) 2040 of FIG. 17.

The vehicle-based computing system 2000 may include various modules configured to obtain context information of the inside or outside of the vehicle. For example, the vehicle-based computing system 2000 may include a camera 2200, a microphone 2310, an input interface 2510, and the like. In addition, the vehicle-based computing system 2000 may include a communication module configured to receive information from the outside, various sensors (e.g., a RADAR sensor and a LIDAR sensor) configured to obtain external environment information of the vehicle, and various sensors configured to obtain internal context information of the vehicle.

The camera 2200 is to input a video signal and may process an image frame of a still image, a video, or the like obtained by an image sensor. The image frame processed by the camera 2200 may be stored in a memory or transmitted to the outside through a communication module. Two or more cameras 2200 may be provided according to embodiments of the disclosure. For example, the camera 2200 may be implemented in various forms such as a front camera, a rear camera, a left camera, a right camera, an internal camera, and a dash camera. In addition, the camera 2200 according to an embodiment of the disclosure may include an infrared camera.

The camera 2200 may obtain background information about objects, geographical features, and a road existing outside the vehicle. The camera 2200 may obtain an ambient image of the vehicle, and the CPU 2020 may identify, from the obtained image, buildings, mountains, other vehicles, pedestrians, lanes, headlights, roadside trees, and the like located within a certain distance from the vehicle.

The CPU 2020 according to the embodiment of the disclosure shown in FIG. 17 controls at least some of operations and functions of the vehicle-based computing system 2000. The CPU 2020 may be connected to the RAM 2030 that is a non-permanent storage device and the HDD 2040 that is a permanent storage device. The HDD 2040 may be replaced by flash memory.

The CPU 2020 may receive a user input by which a user interacts with the CPU 2020. For example, the vehicle-based computing system 2000 may include at least one of the microphone 2310, an auxiliary input unit 2330, the input interface 2510, a universal serial bus (USB) input unit 2530, an onboard global positioning system (GPS) 2120, or a Bluetooth transceiver 2630. In addition, the vehicle-based computing system 2000 may include an input selector 2800 configured to select an input scheme such that the vehicle-based computing system 2000 receives various inputs from the user. Analog inputs received from the microphone 2310 and the auxiliary input unit 2330 may be converted into digital signals by an analog/digital (A/D) converter 2320 before being delivered to the CPU 2020. In addition, although not shown in FIG. 17, a plurality of vehicle components and auxiliary components may communicate with the vehicle-based computing system 2000 by using a vehicle network (e.g., may include a controller area network (CAN) bus but is not limited thereto).

In addition, the vehicle-based computing system 2000 may include a display 2700, a speaker 2410, and the like as an output unit. The speaker 2410 is connected to an amplifier 2420 and may receive an audio output signal from the CPU 2020 through a digital/analog (D/A) converter 2520. In addition, an output of the vehicle-based computing system 2000 may be output through an external device connected by USB or Bluetooth, such as a user navigation device 300 or a navigation device 400 embedded in the vehicle.

The vehicle-based computing system 2000 may include the display 2700. The display 2700 may display information processed by the vehicle-based computing system 2000. When the display 2700 and a touch pad form a layer structure to configure a touchscreen, the display 2700 may be used as not only an output device but also an input device. For example, the display 2700 may include a transparent display or a head-up display. In certain embodiments, the display 2700 can include a passenger seat display 150.

The vehicle-based computing system 2000 may receive data from at least one of the vehicle, a user mobile device 200, a base station 600, or a server.

According to an embodiment of the disclosure, the vehicle-based computing system 2000 may communicate with the user mobile device 200 (e.g., a cellular phone, a smartphone, a personal digital assistant (PDA), or another device supporting a wireless remote network access) by using the Bluetooth transceiver 2630. The user mobile device 200 may be, for example, a device carried by a passenger getting on the vehicle. The user mobile device 200 may communicate with a network outside the vehicle to communicate with the base station 600. For example, the base station 600 may be a base station supporting cellular communication or a Wi-Fi access point.

Pairing of the Bluetooth transceiver 2630 of the vehicle-based computing system 2000 and the user mobile device 200 may be directed by a user input received through the input interface 2510 such as a button. Therefore, the CPU 2020 may be directed such that the Bluetooth transceiver 2630 is paired with a Bluetooth transceiver of the user mobile device 200.

The CPU 2020 may communicate with the network through the user mobile device 200 or directly by using an embedded modem 2610 having an antenna 2620. For example, the modem 2610 may include a USB cellular modem supporting cellular communication.

According to an embodiment of the disclosure, the CPU 2020 may provide an operating system including an application programming interface (API) to communicate with modem application software. The modem application software may access an embedded module or firmware in the Bluetooth transceiver 2630 to perform wireless communication with a Bluetooth transceiver embedded in an external device such as the user mobile device 200. Bluetooth is a scheme included in an Institute of Electrical and Electronics Engineers (IEEE) 802 personal area network (PAN) protocol. An IEEE 802 local area network (LAN) protocol includes Wi-Fi and has a lot of crossover functions. Besides Bluetooth or Wi-Fi, free-space optical communication (e.g., infrared data association (IrDA)) may be used for intra-vehicle wireless communication.

According to another embodiment of the disclosure, which is not shown in FIG. 17, the user mobile device 200 may be replaced by a cellular communication device provided to the electronic apparatus 2010 mounted in the vehicle.

Input data input to the vehicle-based computing system 2000 may be delivered to the CPU 2020 inside the vehicle through the user mobile device 200 and the Bluetooth transceiver 2630. For example, the input data may be stored in the HDD 2040 or another storage medium until the input data is not necessary any more.

The vehicle-based computing system 2000 may include, as an additional source capable of interacting with the vehicle, for example, the user navigation device 300 having a USB connection 320 and/or an antenna 310, the navigation device 400 having a USB connection 410 or another connection, the onboard GPS 2120, or a remote navigation system (not shown) having connectivity to the network. USB is one or a series of networking protocols. Most communication protocols used in the vehicle-based computing system 2000 may be used to perform electrical communication or optical communication.

In addition, the CPU 2020 may communicate with various other auxiliary devices 500. The auxiliary devices 500 may access the CPU 2020 through a wireless connection 510 or a wired connection 520. The auxiliary devices 500 may include a personal media player, a wireless healthcare device, a portable computer, and the like but are not limited thereto.

In addition, the CPU 2020 may be connected to the vehicle based on a local router 2050 using, e.g., a Wi-Fi transceiver 2060. In this case, the CPU 2020 may be connected to a remote network within a coverage of the local router 2050.

According to an embodiment of the disclosure, at least some processes may be executed by computing systems communicating with the vehicle-based computing system 2000. These computing systems may include a wireless device (e.g., a mobile phone) or a remote computing system (e.g., a server) connected through the wireless device. These computing systems may be comprehensively referred to as vehicle associated computing systems (VACS).

Although embodiments of the disclosure have been described with reference to limited embodiments of the disclosure and drawings, various kinds of change or modification can be performed by those of ordinary skill in the art. For example, even when the described techniques are performed in a different order from the described methods and/or the described components of the electronic apparatus 1000, a module, or the like are coupled or combined in a different form from the described methods or replaced by other components or equivalents, an appropriate result may be achieved.

What is claimed is:

1. A method of controlling a passenger seat display of a vehicle, the method comprising:
   obtaining operating state information of the vehicle by detecting an operating state of the vehicle being driven by a driver;
   determining an operating mode of the vehicle, which includes a driving mode and a stop mode, based on the obtained operating state information;
   controlling a driving voltage applied to a viewing angle switching element comprising a polymer dispersed liquid crystal (PDLC), based on the determined operating mode; and
   adjusting brightness or color coordinates of the passenger seat display to a predetermined target brightness value or a predetermined target color coordinate value, respectively, when the driving voltage is applied to the viewing angle switching element.

2. The method of claim 1, wherein the obtaining of the operating state information of the vehicle comprises detecting at least one of a velocity of the vehicle, pressure applied to an accelerator of the vehicle, or an operation of a steering wheel of the vehicle.

3. The method of claim 2, wherein the determining of the operating mode of the vehicle comprises determining the operating mode of the vehicle as the driving mode when the detected speed of the vehicle exceeds a predetermined threshold velocity and determining the operating mode of the vehicle as the stop mode when detecting that the velocity of the vehicle is the predetermined threshold velocity or less.

4. The method of claim 2, wherein the obtaining of the operating state information of the vehicle comprises detecting the operation of the steering wheel, including at least one of a rotating angle, a rotating speed, a rotating direction, a number of times the rotating direction is switched, a steering angle, or a number of times a steering direction of the steering wheel is switched, and
   the determining of the operating mode of the vehicle comprises determining the operating mode of the vehicle as the driving mode when the operation of the steering wheel is detected.

5. The method of claim 1, wherein the controlling of the driving voltage applied to the viewing angle switching element comprises:
   applying the driving voltage to the viewing angle switching element when the operating mode of the vehicle is determined as the driving mode, and
   not applying the driving voltage to the viewing angle switching element when the operating mode of the vehicle is determined as the stop mode.

6. The method of claim 1, wherein the driving voltage applied to the viewing angle switching element is an alternating current (AC) voltage.

7. The method of claim 1, wherein the adjusting of the brightness or the color coordinates of the passenger seat display comprises adjusting the brightness of the passenger seat display to the target brightness value based on an amount of brightness decrease that occurs as a result of the application of the driving voltage to the viewing angle switching element, by controlling a magnitude of a driving current applied to a light source of the passenger seat display.

8. The method of claim 7, wherein information about the amount of brightness decrease is stored in a memory in the vehicle.

9. The method of claim 1, wherein the adjusting of the brightness or the color coordinates of the passenger seat display comprises adjusting the color coordinates of the passenger seat display to the target color coordinate value based on an amount of change in the color coordinates that occurs as a result of the application of the driving voltage to the viewing angle switching element,
wherein the color coordinates of the passenger seat display are adjusted by adjusting RGB output amounts through a timing control board (T-CON board) or an image board controlling an operation of the passenger seat display.

10. The method of claim 9, wherein information about the change in the color coordinate is stored in a memory in the vehicle.

11. An electronic apparatus for controlling a passenger seat display of a vehicle, the electronic apparatus comprising:
the passenger seat display arranged on a dashboard of the vehicle in front of a passenger seat, the passenger seat display comprising a backlight unit (BLU), a viewing angle switching element comprising a polymer dispersed liquid crystal (PDLC), and a liquid crystal display panel;
a sensor configured to detect an operating state of the vehicle being driven by a driver;
a power supply configured to supply direct current (DC) power to the passenger seat display and the sensor;
at least one processor connected to the power supply, sensor, and passenger seat display; and
memory to connected to the at least one processor, the memory storing one or more instructions executable by the at least one processor, wherein execution of the one or more instructions by the at least one processor causes the at least one processor to perform a plurality of operations:
obtaining operating state information of the vehicle from the sensor,
determining an operating mode of the vehicle, which includes a driving mode and a stop mode, based on the obtained operating state information, controlling the power supply to apply a driving voltage to the viewing angle switching element, based on whether the vehicle is determined to be in motion, and
adjusting brightness or color coordinates of the passenger seat display to a predetermined target brightness value or a predetermined target color coordinate value, respectively, when the driving voltage is applied to the viewing angle switching element.

12. The electronic apparatus of claim 11, wherein the sensor comprises at least one of a velocity sensor configured to detect a velocity of the vehicle, an accelerator sensor configured to detect pressure applied to an accelerator of the vehicle, or a steering wheel sensor configured to detect an operation of a steering wheel of the vehicle.

13. The electronic apparatus of claim 12, wherein the at least one processor is further configured to execute the one or more instructions to:
determine the operating mode of the vehicle as the driving mode when a speed of the vehicle, which is detected by a speed sensor, exceeds a predetermined threshold velocity; and
determine the operating mode of the vehicle as the stop mode when the detected speed of the vehicle is the predetermined threshold velocity or less.

14. The electronic apparatus of claim 12, wherein the steering wheel sensor is further configured to detect the operation of the steering wheel, including at least one of a rotating angle, a rotating speed, a rotating direction, a number of times the rotating direction is switched, a steering angle, or a number of times a steering direction of the steering wheel is switched, and
the at least one processor is further configured to execute the one or more instructions to determine the operating mode as the driving mode when the operation of the steering wheel is detected.

15. The electronic apparatus of claim 11, wherein the at least one processor is further configured to execute the one or more instructions to
control the power supply to apply the driving voltage to the viewing angle switching element when the operating mode of the vehicle is determined as the driving mode, and
control the power supply not to apply the driving voltage to the viewing angle switching element when the operating mode of the vehicle is determined as the stop mode.

16. The electronic apparatus of claim 11, further comprising a DC-AC (Alternating Current) converter configured to convert DC power output from the power supply into AC power,
wherein the driving voltage applied to the viewing angle switching element is an AC voltage resulting from conversion by the DC-AC converter.

17. The electronic apparatus of claim 11, further comprising a storage storing information about an amount of brightness decrease of the passenger seat display between when the driving voltage is applied and is not applied to the viewing angle switching element,
wherein the plurality of operations further comprises:
adjusting the brightness of the passenger seat display to the target brightness value by using the information about the amount of brightness decrease.

18. The electronic apparatus of claim 17, wherein plurality of operations further comprise controlling the power supply to change a magnitude of a driving current applied to a light source of the BLU by the power supply, thereby adjusting the brightness of the passenger seat display.

19. The electronic apparatus of claim 11, further comprising a storage storing information about change in the color coordinate of the passenger seat display between when the driving voltage is applied or is not applied to the viewing angle switching element,
wherein the plurality of operations further comprises adjusting the color coordinates of the passenger seat display to the target color coordinate value by using the information about the change in the color coordinate.

20. The electronic apparatus of claim 19, wherein the plurality of operations further comprises adjusting the color coordinates of the passenger seat display by adjusting RGB output amounts through a timing control board (T-CON board) or an image board for controlling an operation of the passenger seat display.

* * * * *